United States Patent
Yamaguchi et al.

(10) Patent No.: US 10,280,659 B2
(45) Date of Patent: May 7, 2019

(54) DOOR-EQUIPPED VEHICLE BODY STRUCTURE

(71) Applicant: HONDA MOTOR CO., LTD., Tokyo (JP)

(72) Inventors: Tomoki Yamaguchi, Wako (JP); Seiji Honda, Wako (JP); Yusuke Fujita, Wako (JP); Shigeki Tanimoto, Wako (JP); Takuya Hoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 15/519,189

(22) PCT Filed: Oct. 1, 2015

(86) PCT No.: PCT/JP2015/077943
§ 371 (c)(1),
(2) Date: Apr. 14, 2017

(87) PCT Pub. No.: WO2016/063703
PCT Pub. Date: Apr. 28, 2016

(65) Prior Publication Data
US 2017/0234041 A1    Aug. 17, 2017

(30) Foreign Application Priority Data

Oct. 24, 2014 (JP) ................... 2014-217315
Oct. 24, 2014 (JP) ................... 2014-217343

(51) Int. Cl.
*E05B 85/12* (2014.01)
*B60J 5/10* (2006.01)
(Continued)

(52) U.S. Cl.
CPC ............... *E05B 85/12* (2013.01); *B60J 5/10* (2013.01); *B60J 5/105* (2013.01); *B60N 3/02* (2013.01);
(Continued)

(58) Field of Classification Search
CPC .......... E05B 85/12; E05B 79/06; E05B 81/76; E05B 81/64; E05B 17/10; B60J 5/10; B60J 5/105; B60J 5/107; B60J 5/101
See application file for complete search history.

(56) References Cited

U.S. PATENT DOCUMENTS 3,496,689 A * 2/1970 Nerem ............... B60P 3/32
296/164
5,876,086 A * 3/1999 Lagrou ............... B60J 5/101
296/146.11
(Continued)

FOREIGN PATENT DOCUMENTS

JP    S57168443    10/1982
JP    S61196117    12/1986
(Continued)

OTHER PUBLICATIONS

International Search Report of International Application No. PCT/JP2015/077943, dated Dec. 22, 2015, 4 pages.

*Primary Examiner* — Justin B Rephann
(74) *Attorney, Agent, or Firm* — Armstrong Teasdale LLP

(57) ABSTRACT

A door-equipped vehicle body structure (10) includes a door opening (35) provided to a vehicle (11), a door (40) for opening and closing the door opening (35), and a grip (45) provided to the door (40). The door (40) is provided with a general surface (62) and an upper surface (63). The general surface (62) is a surface extending along a door surface (61). The upper surface (63) is a surface extending from an upper end (62a) of the general surface (62) toward an outside (22) of the vehicle. The grip (45) is provided so as to project upward from the upper surface (63).

11 Claims, 13 Drawing Sheets

(51) Int. Cl.
*E05B 79/06* (2014.01)
*B60N 3/02* (2006.01)
*E05B 83/20* (2014.01)
*B60S 1/58* (2006.01)

(52) U.S. Cl.
CPC .............. *E05B 79/06* (2013.01); *E05B 83/20* (2013.01); *B60S 1/583* (2013.01)

(56) References Cited

U.S. PATENT DOCUMENTS

| | | | | |
|---|---|---|---|---|
| 6,086,131 | A * | 7/2000 | Bingle | E05B 83/26 292/336.3 |
| 6,131,989 | A * | 10/2000 | Montone | B60J 1/1884 292/336.3 |
| 6,637,801 | B1 * | 10/2003 | Eustache | B60J 5/10 296/106 |
| 7,895,703 | B2 * | 3/2011 | Ina | B60J 5/101 15/250.001 |
| 8,443,552 | B2 * | 5/2013 | Kinoshita | B60J 5/0426 296/146.5 |
| 9,156,335 | B1 * | 10/2015 | Harter | E05B 81/76 |
| 9,771,010 | B2 * | 9/2017 | Lee | B60N 3/023 |
| 9,809,094 | B2 * | 11/2017 | Yamaguchi | B60K 13/04 |
| 9,815,434 | B2 * | 11/2017 | Goto | B60J 5/101 |
| 2006/0152029 | A1 | 7/2006 | Tomasson et al. | |
| 2010/0052358 | A1 * | 3/2010 | Kinoshita | B60J 5/0426 296/146.1 |
| 2010/0320799 | A1 * | 12/2010 | Fukui | B60J 5/101 296/146.8 |
| 2012/0326466 | A1 * | 12/2012 | Kileen | B60J 5/101 296/146.4 |
| 2014/0069015 | A1 * | 3/2014 | Salter | E05B 81/76 49/31 |
| 2015/0330112 | A1 * | 11/2015 | Van Wiemeersch | E05B 81/76 292/201 |
| 2016/0101764 | A1 * | 4/2016 | Matsuura | B60S 1/0466 296/152 |
| 2016/0114662 | A1 * | 4/2016 | Yamaguchi | B60J 5/103 296/146.8 |
| 2018/0187462 | A1 * | 7/2018 | Ayata | B60N 3/023 |

FOREIGN PATENT DOCUMENTS

| | | |
|---|---|---|
| JP | H0337028 | 4/1991 |
| JP | 2004136802 A | 5/2004 |
| JP | 2012162233 A | 8/2012 |
| JP | 2013249593 A | 12/2013 |

* cited by examiner

DOOR-EQUIPPED VEHICLE BODY STRUCTURE

TECHNICAL FIELD

The present invention relates to a door-equipped vehicle body structure including a door for opening and closing a door opening provided to a vehicle.

BACKGROUND ART

In some door-equipped vehicle body structures, an opening is provided in a rear portion of the vehicle, and grips are provided on either side of the opening such that each grip extends vertically. With a hand on the grip, a passenger can get in the vehicle from the outside of the vehicle or get out of the vehicle from the inside of the vehicle.

In this door-equipped vehicle body structure, the opening is provided in the rear portion of the vehicle. Therefore, when a passenger gets out of the vehicle, the passenger, having stood up from the seat, will put the hand on the grip while facing the outside of the vehicle, and get out of the vehicle from the inside to the outside (refer to Patent Document 1, for example).

It is to be noted here that, when the passenger who has stood up gets out of the vehicle while facing the outside of the vehicle, it is preferred that the passenger get out of the vehicle with the hand put on the grip from above.

Further, in some of the door-equipped vehicle body structures, a lining is provided to the interior side of the door of the vehicle, and a grip oriented laterally is provided to project from the lining toward the inside of the vehicle in a horizontal direction. Owing to the grip projecting laterally, a space is provided between the grip and the lining.

The laterally projecting grip allows the hand to be placed on the grip from above easily. By pushing the grip toward the outside of the vehicle with the hand on the grip, the passenger can open the door (refer to Patent Document 2, for example).

However, because the grip projects laterally from the lining, when the hand is placed on the grip and a weight (load) is applied on the grip from above, the load acts on a position remote from the attachment part of the grip toward the inside of the vehicle.

As a result, the load acting on the grip from above causes a downward rotational force (moment) to be applied on the attachment part of the grip. To support this downward rotational force, it is necessary to adequately increase the stiffness of the attachment part of the grip.

Further, because the grip projects from the lining toward the inside of the vehicle, the grip is placed in the space inside the vehicle. Thus, the space inside the vehicle is reduced by the grip, and in such cases as when luggage is loaded into the vehicle (particularly, into the rear portion of the vehicle), the luggage may interfere with the grip.

The grip, projecting laterally from the lining, is provided with a switch on an upper surface thereof. The switch is an operation switch for releasing engagement between the vehicle and the door.

By putting the hand on the grip and operating the switch, a user can release the engagement between the vehicle and the door. If the grip is pushed toward the outside of the vehicle in this state, the door is opened.

PRIOR ART DOCUMENT(S)

Patent Document(s)

Patent Document 1: JPH03-37028U
Patent Document 2: JP3951884B

BRIEF SUMMARY OF THE INVENTION

Task to be Accomplished by the Invention

An object of the present invention is to provide a door-equipped vehicle body structure that can support the force acting on the grip from above without increasing the stiffness of the attachment part of the grip, and can secure a wide space inside the vehicle.

Means to Accomplish the Task

The invention according to a first aspect provides a door-equipped vehicle body structure, comprising a door opening provided to a vehicle, a door for opening and closing the door opening, and a grip provided to the door, wherein: the door is provided with a general surface extending along a door surface and an upper surface extending from an upper end of the general surface toward an outside of the vehicle; the general surface and the upper surface constitute a part of a vehicle interior surface; and the grip is provided so as to project upward from the upper surface.

In the invention according to a second aspect, preferably, the door is provided with a window opening formed above the upper surface, and the grip is provided at a position overlapping with the window opening.

In the invention according to a third aspect, preferably, the door is provided with a window panel covering the window opening, and the grip is spaced apart from the window panel in an in and out direction of the door.

In the invention according to a fourth aspect, preferably, the door is provided with a wiper device for wiping the window panel with a wiper blade, and the grip is provided at a position overlapping with the wiper blade at a stop position in the in and out direction of the door.

In the invention according to a fifth aspect, preferably, the door is provided, in a vicinity of a lower edge of the window opening, with a motor attachment part to which a drive unit of the wiper device is attached, the lower edge of the window opening is located more downward as it extends in a direction away from the motor attachment part, and the grip includes: a horizontal portion extending in a horizontal direction from the motor attachment part; and a leg portion extending downward from the horizontal portion.

In the invention according to a sixth aspect, preferably, the door opening is provided in a rear portion of the vehicle, and the door is supported by a hinge provided on a side of the motor attachment part opposite to the leg portion, such that the door is pivotable in a lateral direction.

In the invention according to a seventh aspect, preferably, the upper surface is slanted downward from the window panel to the general surface.

In the invention according to an eighth aspect, preferably, the door-equipped vehicle body structure further comprises: a striker provided to one of the door and the vehicle; a latch device provided to the other of the door and the vehicle to be engaged with the striker; and a switch for activating the latch device, wherein: the vehicle interior surface faces an inside of the vehicle; the grip includes an opposing portion that is spaced apart from the vehicle interior surface and opposes the vehicle interior surface; and the switch is disposed on the opposing portion.

It is to be noted here that in a case where the switch is provided on the upper surface of the grip, the luggage or the passenger's hand may inadvertently come in contact with the switch. Therefore, the door may open as a result of inadvertent contact of the luggage or the passenger's hand with the switch.

To address this problem, according to the eighth aspect, the vehicle interior surface is configured to face the inside of the vehicle, and the grip is provided to be spaced apart from the vehicle interior surface. Further, the grip is provided with an opposing portion that opposes the vehicle interior surface, and the switch is provided to the opposing portion.

In the invention according to a ninth aspect, preferably, the vehicle interior surface includes an inner-outer surface extending from the general surface toward an outside of the vehicle, and the opposing portion opposes the inner-outer surface.

In the invention according to an tenth aspect, preferably, the switch is disposed on a part of the opposing portion facing the inside of the vehicle.

In the invention according to a eleventh aspect, preferably, the inner-outer surface is the upper surface which extends from the upper end of the general surface toward the outside of the vehicle and from which the grip projects upward.

In the invention according to a twelfth aspect, preferably, the grip comprises: a horizontal portion extending in a horizontal direction; and a leg portion extending downward from the horizontal portion, wherein the switch is provided adjacent to a corner portion where the horizontal portion and the leg portion intersect.

In the invention according to a thirteenth aspect, preferably, the door is attached to the vehicle via a hinge to be pivotable in a lateral direction, and the leg portion is provided to an end part of the horizontal portion opposite to the hinge.

In the invention according to a fourteenth aspect, preferably, the grip is provided with a surrounding wall that extends out more than an operation surface of the switch in a pressing direction of the switch, and the surrounding wall covers a circumference of at least a part of the switch facing the inside of the vehicle.

In the invention according to a fifteenth aspect, preferably, the grip comprises: a bar member disposed on a side opposite to the vehicle interior surface and forming an outer circumference of the grip; and an inner cover member disposed on a side facing the vehicle interior surface and forming an inner circumference of the grip, the inner cover member including the opposing portion, wherein the bar member is formed to have a higher stiffness than the inner cover member, and a wiring for the switch is disposed between the inner cover member and the bar member.

Effect of the Invention

In the invention according to the first aspect, the general surface of the door is configured to extend along the door surface, and the upper surface is configured to extend from the upper end of the general surface toward the outside of the vehicle. The grip is configured to project upward from this upper surface. Since the grip projects upward from the upper surface, when the passenger gets out of the vehicle with a hand on the grip, even if the passenger's weight (load) acts on the grip from above, the rotational force (moment) acting on the attachment part of the grip is suppressed.

Thus, the force acting on the grip from above can be supported without increasing the stiffness of the attachment part of the grip.

Further, by disposing the grip to project upward from the upper surface of the door, it is possible to arrange the grip along an extension line of the general surface. This prevents the grip from projecting from the general surface of the door toward the inside of the vehicle in the horizontal direction, or suppresses an amount of projection of the grip in the horizontal direction.

Thereby, a large space is secured inside the vehicle, and therefore, when luggage is loaded into the vehicle, for example, the luggage is prevented from interfering with the grip.

In the invention according to the second aspect, a window opening is provided above the upper surface of the door, and the grip is disposed to overlap with the window opening.

It is to be noted here that the window opening is a part to be covered with a window panel (for example, window glass), and is configured to have a small thickness dimension compared to the other parts of the door.

Therefore, by positioning the grip to overlap with the window opening, the grip can be disposed apart from the window opening (namely, window panel). Thereby, when the passenger puts a hand on the grip from above and grabs the same, the hand of the passenger is prevented from interfering with the door.

In the invention according to the third aspect, the window opening is covered with the window panel, and the grip is spaced apart from the window panel in the in and out direction of the door. Thus, a space to put a hand (particularly, fingers) in is provided between the grip and the window panel.

Thereby, when the passenger places a hand on the grip from above, the hand can be put in the space between the grip and the window panel, and therefore, the grip is made even easier to grab.

In the invention according to the fourth aspect, the door is provided with a wiper blade, and the grip is disposed to overlap with the wiper blade at the stop position. As the grip is provided to overlap with the wiper blade, the wiper blade and the grip, which prevent visibility from the inside to the outside of the vehicle, can be provided at the same position.

Thereby, an opaque area (so-called black ceramic area) of the window panel for hiding the wiper blade and the grip from view can be suppressed small, and a wide transparent area of the window panel can be achieved.

In the invention according to the fifth aspect, a motor attachment part is provided in the vicinity of the lower edge of the window opening, and the drive unit of the wiper device is attached to the motor attachment part.

Thus, the motor attachment part is a part where the drive unit of the wiper device is attached, and is formed to have a high stiffness. Therefore, by configuring the horizontal portion of the grip to extend from the motor attachment part, it is possible to firmly support the horizontal portion on the motor attachment part and ensure support stiffness of the horizontal portion (namely, grip).

Further, the lower edge of the window opening is configured to be located more downward as it extends in the direction away from the motor attachment part. By configuring the lower edge of the window opening to be located downward, the lower edge of the window opening can be placed lower than the horizontal portion of the grip. Thereby, it is possible to dispose the grip to overlap with the window panel, and secure a space between the grip and the window panel.

Thus, a hand can be put in the space between the grip and the window panel, and therefore, the grip can be grabbed easily.

Further, the grip includes a horizontal portion and a leg portion, such that the horizontal portion extends in the horizontal direction from the motor attachment part and the leg portion extends downward from the horizontal portion. Thereby, an attachment part at which the horizontal portion is attached to the motor attachment part and an attachment part at which the leg portion is attached to the lower edge can be arranged at different heights.

This can suppress the rotational force applied on these attachment parts of the grip. The rotational force may be, for example, a force acting on the door when the door is opened or closed, or a force acting on the door when a passenger gets out of the vehicle by opening the door.

Further, by configuring the horizontal portion of the grip to extend from the motor attachment part continuously, an increased sense of unity between the door and the grip is achieved and the design of the door is improved.

In the invention according to the sixth aspect, a hinge is provided on the side of the motor attachment part opposite to the leg portion, and the door is supported by the hinge to be pivotable in the lateral direction (in the left and right direction). Therefore, the horizontal portion of the grip extends in the direction away from the hinge, and the leg portion is disposed at a position remote from the hinge. Namely, the grip can be disposed apart from the hinge.

Thereby, when the door is opened or closed with a hand put on the grip, an opening/closing force of the door can be applied on a position remote from the hinge, and this facilitates the opening/closing of the door.

Further, the motor attachment part may be disposed closer to the grip than the hinge. By attaching the drive unit of the wiper to the motor attachment part, it is possible to dispose the motor of the wiper device close to the vehicle widthwise center. Thereby, in the window panel, a wiping area of the wiper device is secured and a favorable view is achieved.

In the invention according to the seventh aspect, the upper surface is slanted downward from the window panel to the general surface. Thereby, when a hand is put in the space between the window panel and grip, the finger tips can be smoothly moved toward the inside of the vehicle without touching the upper surface.

Thus, it is possible to put the hand on the grip from above and grab the grip with ease.

In the invention according to the eighth aspect, the grip is provided with an opposing portion that opposes the vehicle interior surface, and the switch is disposed on the opposing portion. Thus, the switch can be disposed to oppose the vehicle interior surface. Thereby, it is possible to inhibit the luggage, passenger's hand, or the like from inadvertently touching the switch and opening the door.

In the invention according to the ninth aspect, the vehicle interior surface includes an inner-outer surface that extends from the general surface toward the outside of the vehicle. Further, the opposing portion is configured to oppose this inner-outer surface.

Thereby, it is possible to prevent the grip from projecting from the general surface of the door toward the inside of the vehicle in the horizontal direction or suppress an amount of projection of the grip in the horizontal direction. Thus, a large space is secured inside the vehicle, and therefore, when luggage is loaded into the vehicle, for example, the luggage is prevented from interfering with the grip.

In the invention according to the tenth aspect, the opposing portion is provided with a part facing the inside of the vehicle, and the switch is disposed on this part. Thereby, the switch can be viewed easily from inside the vehicle, and this improves the operability of the switch by the passenger.

In the invention according to the eleventh aspect, the inner-outer surface is the upper surface extending from the upper end of the general surface toward the outside of the vehicle. The grip projects upward from this upper surface. Thereby, as described in connection with the effects of the invention of the first aspect, when the passenger gets out of the vehicle with a hand on the grip, even if the passenger' weight (load) acts on the grip from above, a rotational force (moment) does not act on the attachment part of the grip.

Thus, the force acting on the grip from above can be supported without increasing the stiffness of the attachment part of the grip.

In the invention according to the twelfth aspect, a corner portion is formed by the horizontal portion and the leg portion of the grip. Thus, in a state where a hand is put on the horizontal portion of the grip, movement of the hand along the horizontal portion can be regulated by the corner portion, and the hand can be retained at the corner portion.

Further, the switch is provided adjacent to the corner portion. Thus, the switch is disposed at a position that is to be adjacent to the hand retained at the corner portion. Thereby, it becomes possible to operate the switch easily with the hand retained at the corner portion, and the operability of the switch is improved.

In the invention according to the thirteenth aspect, in the state where the door is attached to the vehicle via a hinge to be pivotable in the lateral direction, the leg portion is provided to an end part of the horizontal portion opposite to the hinge.

It is to be noted here that when a hand is put on the grip and a force is applied in an opening direction of the door, the hand is urged to move along the horizontal portion in the direction away from the hinge. Therefore, the leg portion is provided to the end part of the horizontal portion opposite to the hinge. The switch is disposed adjacent to the corner portion formed by the horizontal portion and the leg portion.

Thus, the switch is disposed in the direction in which the hand is urged to move when the door is opened. Thereby, when opening the door, it is possible to operate the switch easily with the hand, and the operability of the switch is improved.

In the invention according to the fourteenth aspect, a surrounding wall is provided around the switch, such that the surrounding wall extends out more than the operation surface of the switch. Thereby, in the state where the hand is put on the grip, it is possible to inhibit the switch from being operated inadvertently by the hand.

In the invention according to the fifteenth aspect, the grip is provided with a bar member and an inner cover member. The bar member forms the outer circumference of the grip, and the inner cover member forms the inner circumference of the grip. Further, the bar member is formed to have a higher stiffness than the inner cover member.

The bar member is a part to be grabbed with a hand when the door is opened or closed. By increasing the stiffness of the bar member, stiffness of the grip can be ensured.

Further, the inner cover member includes the opposing portion, and the switch is provided to the opposing portion. Thereby, a wire harness for the switch can be routed using the space between the inner cover member and the bar member.

Thus, the stiffness of the grip can be increased by the bar member, and the wire harness for the switch can be routed through the space between the inner cover member and the bar member.

Further, as the grip is divided into the bar member and the inner cover member, it is possible, prior to assembly of the inner cover member to the bar member, to route the wire harness. Thereby, the work for routing the wire harness for the switch can be facilitated.

EMBODIMENTS FOR CARRYING OUT THE INVENTION

A best embodiment for carrying out the present invention will be described in the following with reference to the appended drawings. It is to be noted that "front (Fr)," "rear (Rr)," "left (L)," and "right (R)" represent the directions as viewed from the driver.

Embodiment

A door-equipped vehicle body structure 10 according to an embodiment will be described. In the following, the door-equipped vehicle body structure 10 will be simply referred to as the vehicle body structure 10.

Figure 1:
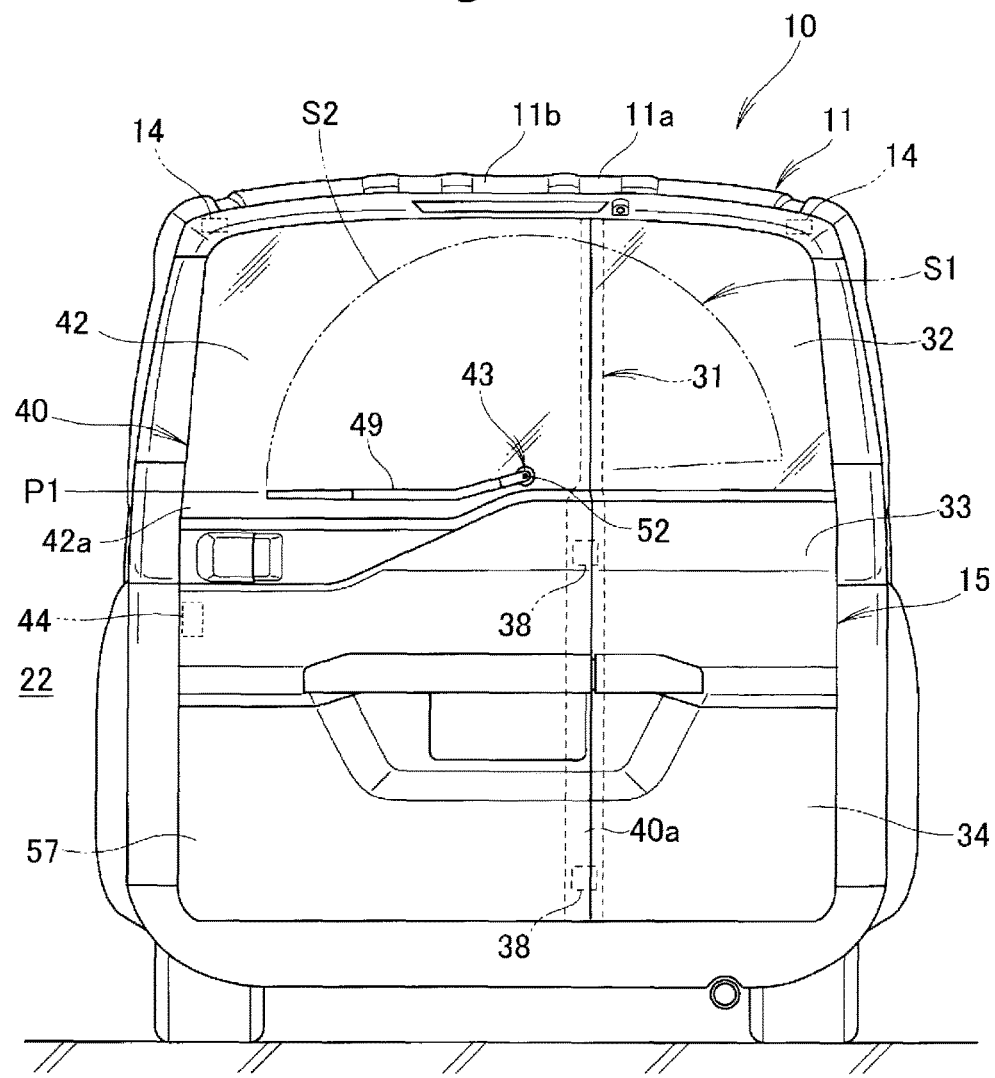
FIG. 1 is a rear view showing a door-equipped vehicle body structure relating to the present invention as viewed from the rear of a vehicle.
Figure 2:
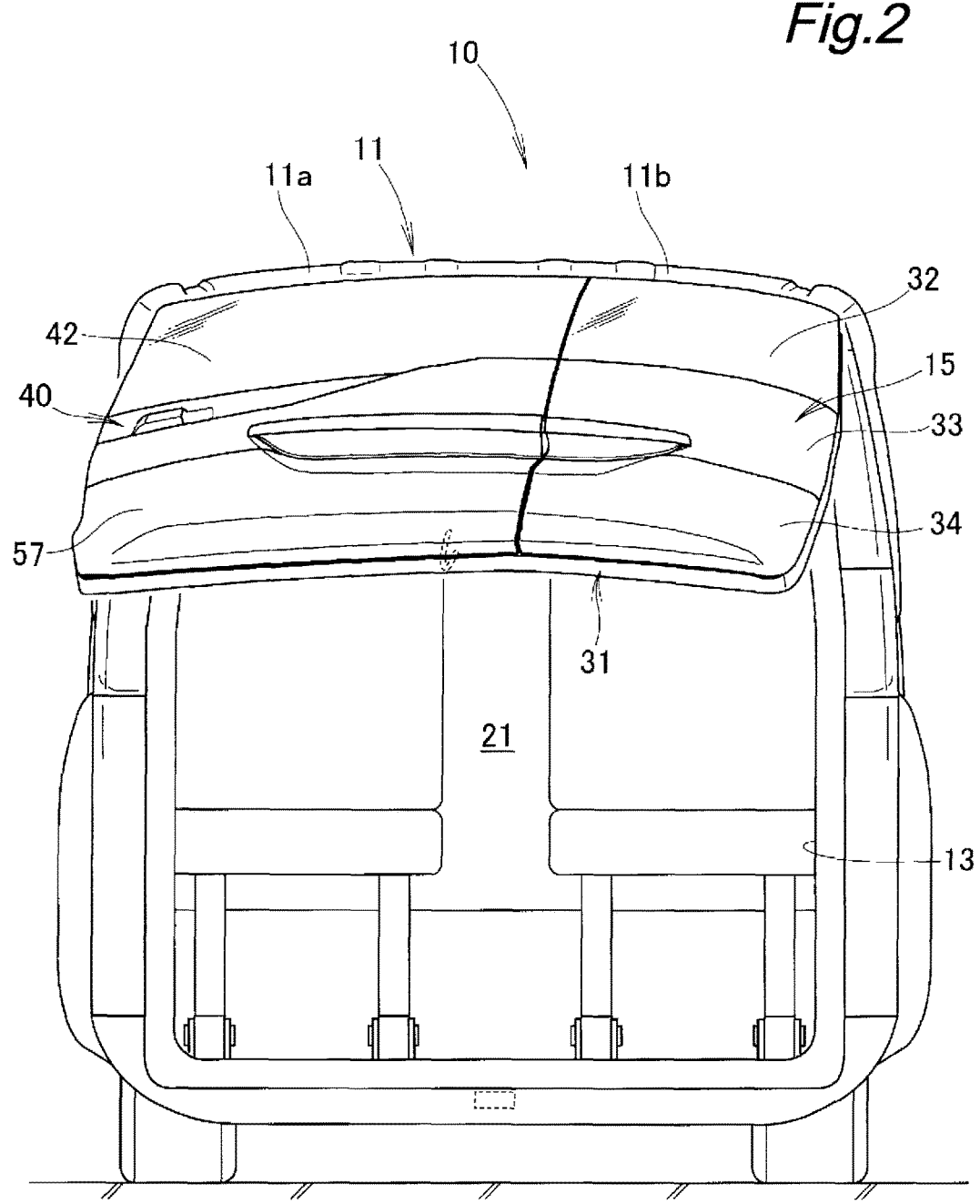
FIG. 2 is a rear view showing the door-equipped vehicle body structure of FIG. 1 with a tailgate opened.

As shown in FIGS. 1 and 2, the vehicle body structure 10 includes a rear opening 13 provided in a rear portion 11a of a vehicle 11, multiple gate-supporting shafts 14 provided to the rear portion 11a of the vehicle 11, and a tailgate 15 configured to pivot about an axis defined by the multiple gate-supporting shafts 14 to open and close the rear opening 13.

The tailgate 15 includes a gate body 31 supported in the rear portion 11a of the vehicle 11 so as to be pivotable in the vertical direction, a gate window glass 32 provided to the gate body 31, an upper gate external surface member 33 provided below the gate window glass 32, and a lower gate external surface member 34 provided below the upper gate external surface member 33.

Specifically, the gate body 31 is supported by an upper part 11b of the rear portion 11a of the vehicle 11 via the multiple gate-supporting shafts 14 to be pivotable in the vertical direction. This gate body 31 is a member constituting the rear portion 11a of the vehicle 11.

The upper gate external surface member 33 and the lower gate external surface member 34 are members made of resin and constitute the outer surface of the tailgate 15.

Figure 3:
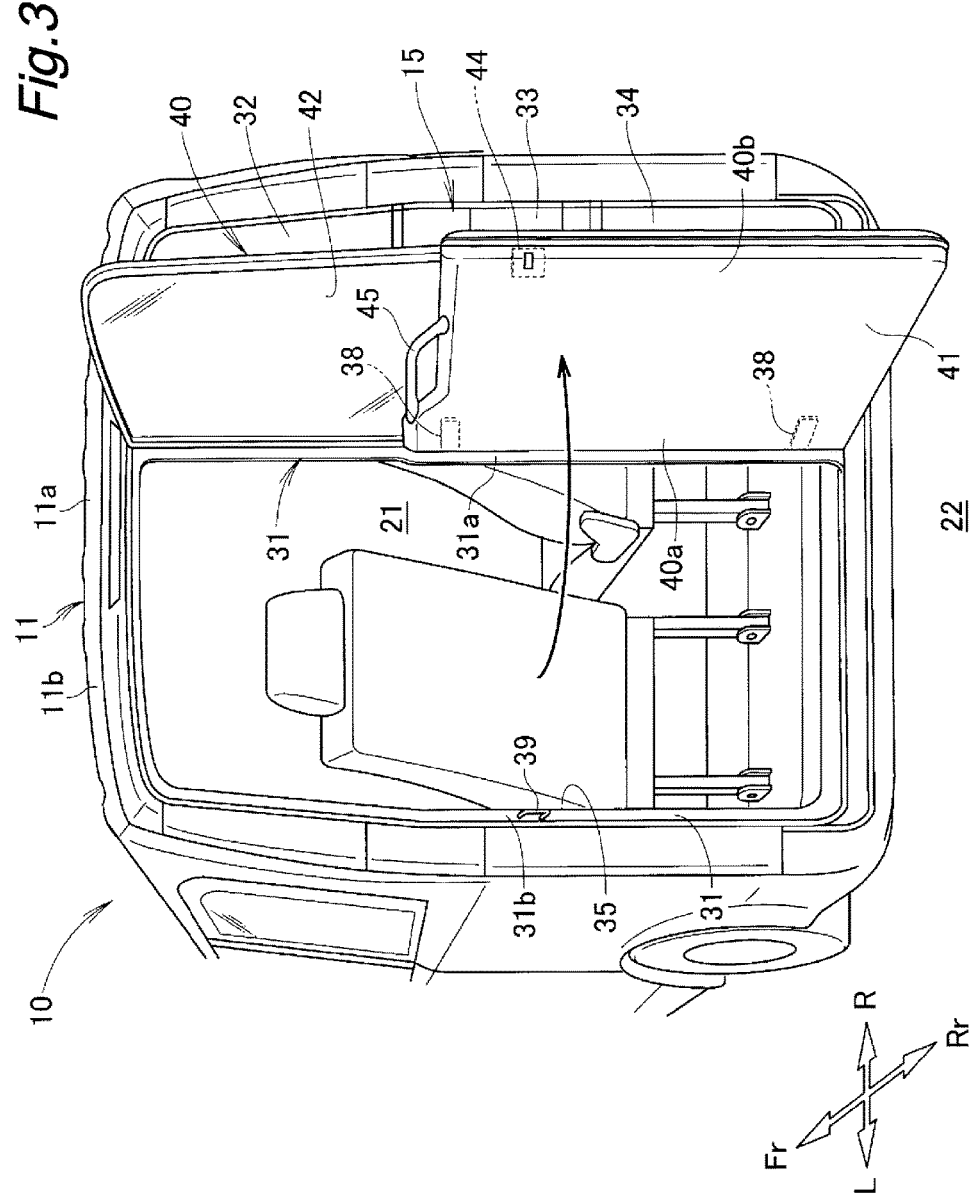
FIG. 3 is a rear view showing the door-equipped vehicle body structure of FIG. 1 with a door opened.

Further, as shown in FIG. 3, the tailgate 15 is provided with a door opening 35 formed in the gate body 31 on the left side of the gate window glass 32, the upper gate external surface member 33, and the lower gate external surface member 34.

In addition, the tailgate 15 includes an upper door hinge 38 and a lower door hinge 38 provided to the gate body 31, a door 40 having a right edge 40a attached to the upper door hinge 38 and the lower door hinge 38, and a striker 39 provided to the gate body 31.

Specifically, the upper door hinge 38 and the lower door hinge 38 are provided to a right side portion 31a relative to the door opening 35 of the gate body 31. In an example, the right side portion 31a relative to the door opening 35 is disposed to the right of the vehicle widthwise center, whereby the upper door hinge 38 and the lower door hinge 38 are disposed to the right of the vehicle widthwise center.

Further, the striker 39 is provided to a left side portion 31b relative to the door opening 35 of the gate body.

The door opening 35 is in communication with the rear opening 13 in a state where the tailgate 15 is closed.

As shown in FIG. 2, when the tailgate 15 is opened upward and disposed substantially horizontally, the rear opening 13 is uncovered. When the rear opening 13 is uncovered, the inside 21 and the outside 22 of the vehicle are brought into communication, such that the passenger is allowed to get in or out of the vehicle and the luggage is allowed to be put in or out of the vehicle.

On the other hand, when the tailgate 15 is closed downward, the tailgate 15 is disposed substantially vertically. In this state, the rear opening 13 is closed by the tailgate 15.

Referring back to FIG. 3, the right edge 40a of the door 40 is pivotably supported by the right side portion 31a of the gate body 31 via the upper door hinge 38 and the lower door hinge 38. Thereby, a left edge 40b of the door 40 can be opened relative to the gate body 31 toward the outside 22 of the vehicle in the horizontal direction (in other words, in the lateral direction or in the left and right direction). Namely, the left edge 40b is an open end 40b of the door 40.

Thus, the door opening 35 is opened and closed by the door 40 as the door 40 is pivoted in the horizontal direction about an axis defined by the upper door hinge 38 and the lower door hinge 38.

Specifically, when the door 40 is opened horizontally in the right direction as indicated by an arrow, the door opening 35 is uncovered. The door opening 35 is in communication with the rear opening 13. Therefore, when the door opening 35 is uncovered, the inside 21 and the outside 22 of the vehicle are brought into communication, whereby a passenger is allowed to get in or out of the vehicle or luggage is allowed to be put into or out of the vehicle via the door opening 35.

On the other hand, when the door 40 is closed, the door opening 35 is closed by the door 40. In the state where the door 40 is closed, a latch device 44 of the door 40 is engaged with the striker 39 of the tailgate 15, such that the door 40 is locked at the closed position.

Figure 4:
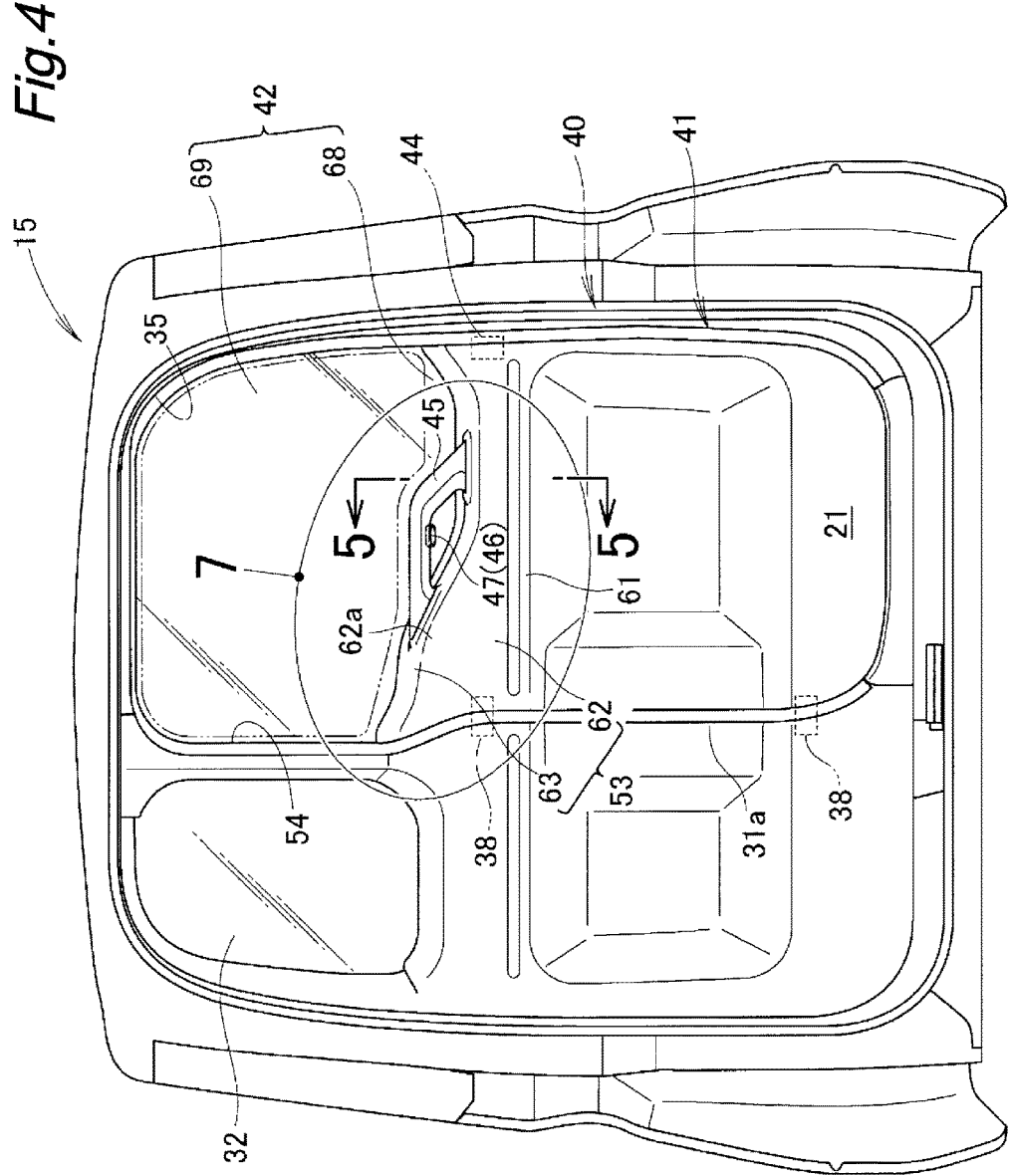
FIG. 4 is a front view showing the door-equipped vehicle body structure of FIG. 1 as viewed from inside the vehicle.
Figure 5:
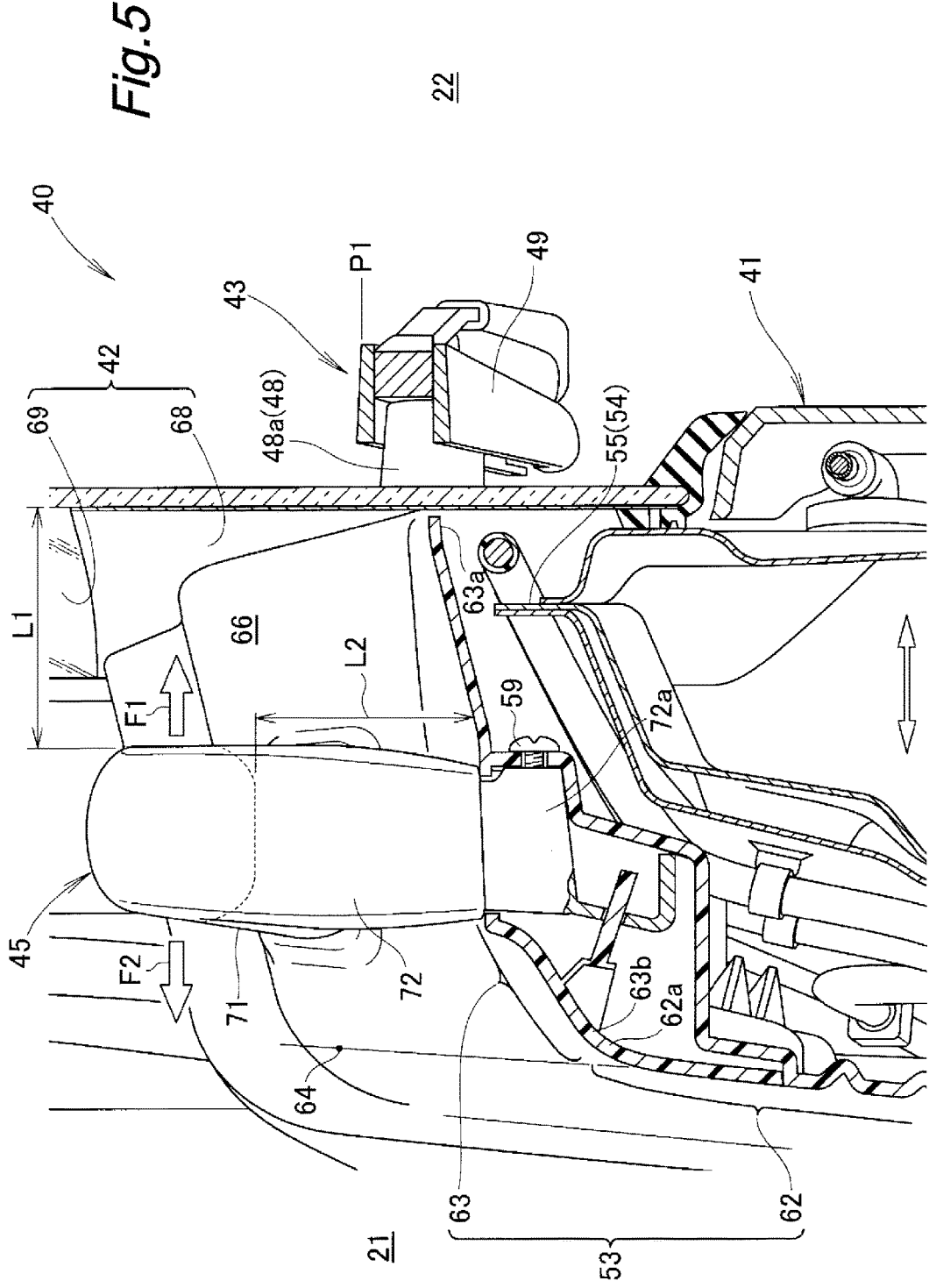
FIG. 5 is a cross-sectional view taken along line 5-5 in FIG. 4.

As shown in FIGS. 4 and 5, the door 40 includes a door body 41 pivotably supported by the right side portion 31a (refer to FIG. 3) of the gate body 31 via the upper door hinge 38 and the lower door hinge 38, and a door window glass (window panel) 42 provided to an upper part of the door body 41.

Further, the door 40 includes a wiper device 43 to wipe the door window glass 42, a latch device 44 provided to a part of the door body 41 adjacent to the open end 40b of the door 40, a grip 45 provided to a part of the door body 41 below the door window glass 42, and a switch 46 provided to the grip 45.

When a motor (drive unit) 48 of the wiper device 43 is activated, a drive shaft 48a of the motor 48 is driven. The driving of the drive shaft 48a causes a wiper blade 49 (also refer to FIG. 1) of the wiper device 43 to operate to wipe the door window glass 42.

Further, upon operation of the switch 46, the latch device 44 is caused to operate such that engagement between the latch device 44 and the striker 39 (refer to FIG. 3) is released.

The door body 41 includes a vehicle interior surface 53 facing the inside 21 of the vehicle 11, a window opening 54 formed in a substantially upper half of the door body 41, a motor attachment part 56 (refer to FIG. 6) formed near a lower edge 55 of the window opening 54, and a door external surface member 57 (refer to FIG. 1) facing the outside 22 of the vehicle 11 and made of resin.

The door external surface member 57 is a member made of resin and disposed below the window opening 54 to form an external surface of the door body 41. The vehicle interior surface 53 is a lining forming an inner wall of the inside 21 of the vehicle.

The motor attachment part 56 is a part where a motor bracket 51 (refer to FIG. 6) for the wiper device 43 is attached, and is formed to have a high stiffness. The motor 48 is attached to the motor bracket 51.

Thus, the motor 48 is firmly attached to the motor attachment part 56 via the motor bracket 51.

The vehicle interior surface 53 includes a general surface 62 extending along a door surface 61 of the door 40, and an inner-outer surface 63 connected to an upper end 62a of the general surface 62. The door surface 61 is an inner surface of the door 40, and defines the inside 21 of the vehicle when the door 40 is closed.

The inner-outer surface 63 is an upper surface extending from the upper end 62a of the general surface 62 toward the vehicle outside. Hereinafter, the "inner-outer surface 63" will be referred to as an "upper surface 63."

It is to be noted that in addition to the general surface 62 and the upper surface 63, the vehicle interior surface 53 includes other surfaces such as a side surface of a door widthwise end part.

The upper surface 63 is slanted downward from its outer end 63a on the door window glass 42 side to its inner end 63b on the general surface 62 side. The window opening 54 is formed above the upper surface 63 to have a substantially rectangular shape in plan view, and the door window glass 42 is attached thereto. Namely, the window opening 54 is covered with the door window glass 42.

Figure 6:
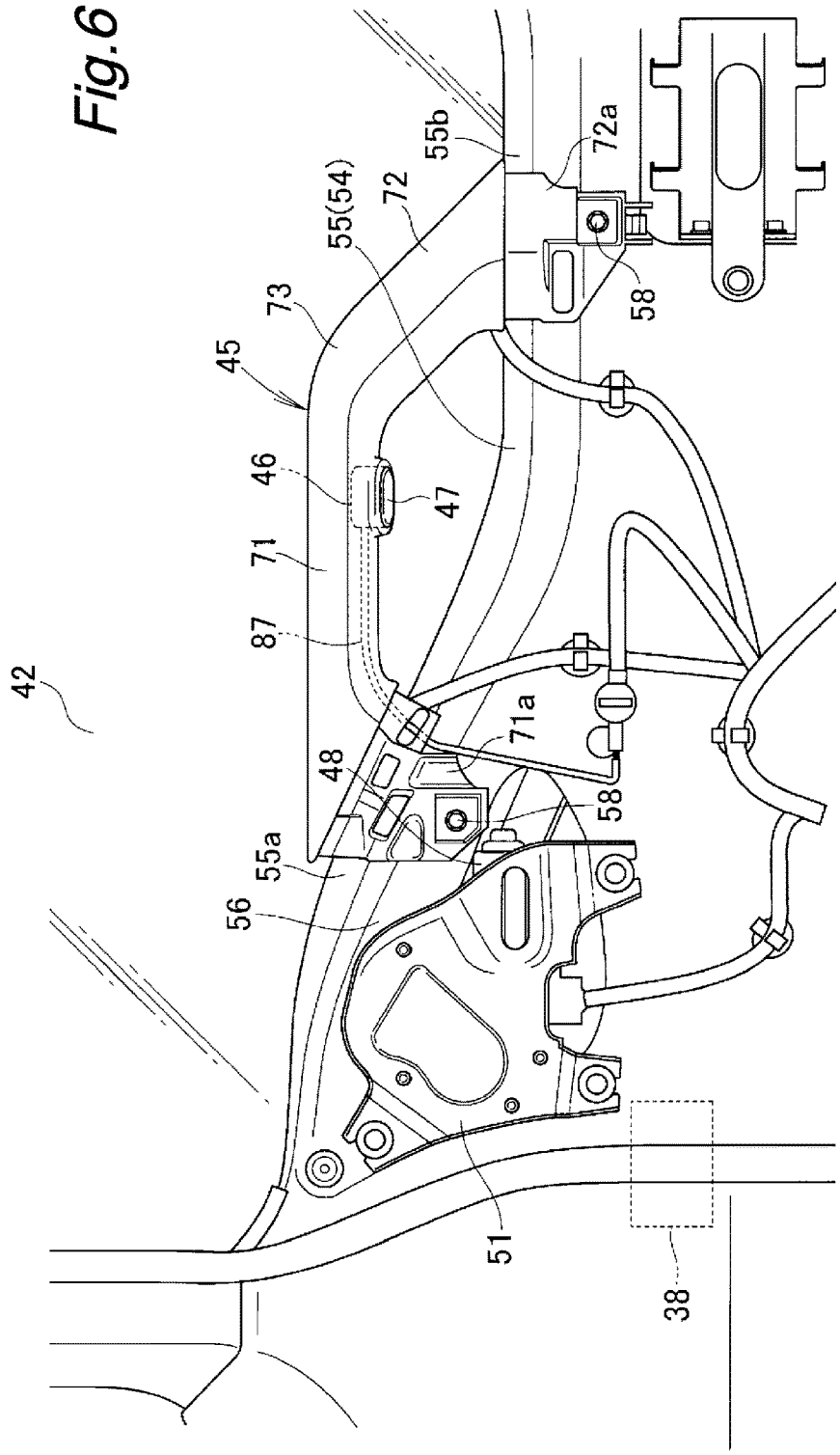
FIG. 6 is a front view of an essential part of the door shown in FIG. 4, in which a vehicle interior surface has been removed.

As shown in FIG. 6, the lower edge 55 of the window opening 54 is located (offset) more downward as it extends in a direction away from the motor attachment part 56 outward in the vehicle width direction. The grip 45 is attached to the lower edge 55 of the window opening 54 at an upper section 55a of the lower edge 55 which is near the motor attachment part 56 and at a lower section 55b of the same which is located lower than the upper section 55a.

Specifically, a right end 71a of a horizontal portion 71 of the grip 45 is attached to the upper section 55a by means of a bolt 58 and a nut (not shown in the drawings). Further, a lower end 72a of a leg portion 72 of the grip 45 is attached to the lower section 55b by means of a bolt 58 and a nut (not shown in the drawings). In this state, the grip 45 projects upward from the lower edge 55 of the window opening 54.

Referring back to FIG. 5, the lower edge 55 of the window opening 54, the right end 71a of the horizontal portion 71 of the grip 45 (refer to FIG. 6), and the lower end 72a of the leg portion 72 of the grip 45 are covered from above by the upper surface 63 of the vehicle interior surface 53. The upper surface 63 is attached to the grip 45 with a screw 59.

In this state, the grip 45 projects upward from the upper surface 63 of the door body 41.

The grip 45 is disposed at a position that overlaps with (namely, laps over) the window opening 54 in the in and out direction of the door 40. The in and out direction of the door 40 is a direction indicated by an arrow at the bottom center of FIG. 5, and is the same as the thickness direction of the door 40. In other words, the grip 45 is disposed at a position that overlaps with the window opening 54 as viewed in the thickness direction of the door 40.

The window opening 54 is covered with the door window glass 42.

It is to be noted here that the door window glass 42 is configured to have a small thickness dimension compared to the door body 41. Therefore, when the grip 45 is positioned to overlap with the window opening 54, the grip 45 is spaced apart from the door window glass 42 toward the inside 21 of the vehicle by a distance L1.

Namely, a space 66 to put a hand (particularly, fingers) in is provided between the grip 45 and the door window glass 42.

Thereby, when a passenger places a hand on the grip 45 from above, the hand can be put in the space 66 between the grip 45 and the door window glass 42, and this makes the grip 45 easy to grab.

Further, as the grip 45 projects upward from the upper surface 63 of the door body 41, the grip 45 is spaced apart from the vehicle interior surface 53 (particularly, from the upper surface 63) by a distance L2.

Thereby, when the passenger puts a hand on the grip 45 from above to grab the grip 45, the upper surface 63 is prevented from interfering with the hand of the passenger.

Further, the upper surface 63 is slanted downward from the outer end 63a on the door window glass 42 side to the inner end 63b on the general surface 62 side. Thereby, when a hand is put in the space 66 between the door window glass 42 and the grip 45, the finger tips can be smoothly moved toward the inside 21 of the vehicle without touching the upper surface 63.

Thus, it is possible to put the hand on the grip 45 from above easily and grab the grip 45 with ease.

Further, the grip 45 is provided at a position that overlaps with (laps over) the wiper blade 49 in a state where the wiper blade 49 is located at a stop position P1 (also refer to FIG. 1).

As the grip 45 is provided to overlap with the wiper blade 49, the wiper blade 49 and the grip 45, which prevent visibility from the inside 21 of the vehicle to the outside 22 of the vehicle, are provided at the same position.

It is to be noted here that the grip 45 and the wiper blade 49 at the stop position P1 are disposed in an opaque area 68 (so-called black ceramic area) of the door window glass 42. Therefore, the wiper blade 49 and the grip 45 are hidden by the opaque area 68 so as not to be visible.

In addition, as the grip 45 and the wiper blade 49 are disposed at the same position, the opaque area 68 of the door window glass 42 is suppressed small, and a wide transparent area 69 of the door window glass 42 is achieved.

Figure 7:
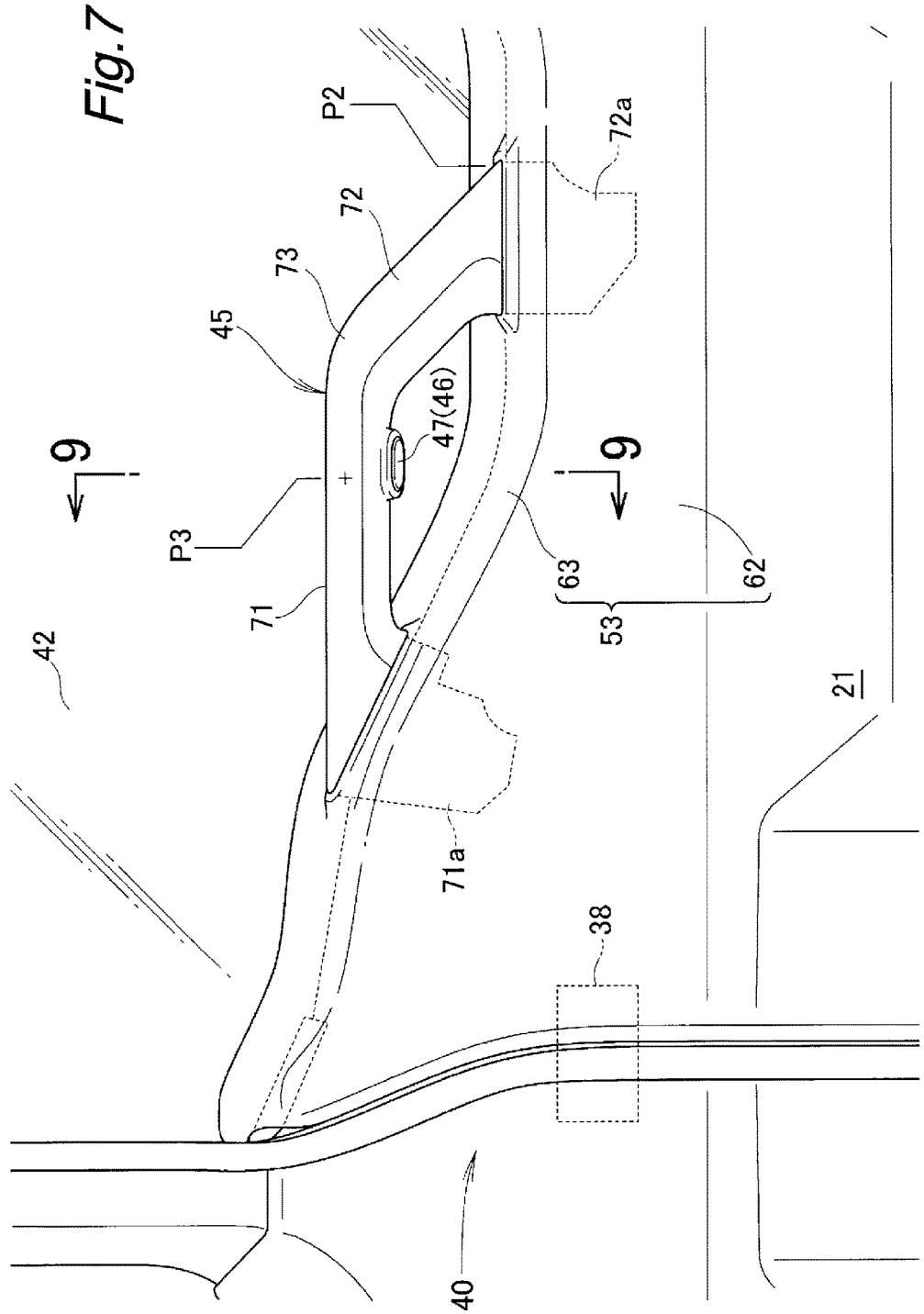
FIG. 7 is an enlarged view of a part 7 in FIG. 4.

As shown in FIGS. 6 and 7, the grip 45 includes a horizontal portion 71 extending from the motor attachment part 56 in the horizontal direction and a leg portion 72 extending from the horizontal portion 71 downward. Because the leg portion 72 extends from the horizontal portion 71 downward, the leg portion 72 may also referred to as a downward leg.

Specifically, as described above, the right end 71a of the horizontal portion 71 of the grip 45 is attached to the upper section 55a. The upper section 55a is a portion adjacent to the motor attachment part 56.

Accordingly, the horizontal portion 71 extends from the motor attachment part 56 horizontally and outward in the vehicle width direction. The motor attachment part 56 is a portion formed to have a high stiffness.

Thus, as the horizontal portion 71 of the grip 45 is configured to extend from the motor attachment part 56, the horizontal portion 71 is firmly supported on the motor attachment part 56. Thereby, support stiffness of the horizontal portion 71 (namely, the grip 45) is ensured.

Further, the lower edge 55 of the window opening 54 is located more downward as it extends in a direction away from the motor attachment part 56 outward in the vehicle width direction. Due to the downward location of the lower edge 55 of the window opening 54, the lower edge 55 of the window opening 54 is disposed lower than the horizontal portion 71 of the grip 45.

Thereby, as described above, the grip 45 overlaps with the door window glass 42, and the space 66 (refer to FIG. 5) is provided between the grip 45 and the door window glass 42. Thus, a hand may be put in the space 66 between the grip 45 and the door window glass 42, and therefore, it is easy to grab the grip 45.

The leg portion 72 extends downward from an end part of the horizontal portion 71 on the side of a corner portion 73. Thus, the right end (i.e., attachment part) 71a of the horizontal portion 71 attached to the upper section 55a and the lower end (i.e., attachment part) 72a of the leg portion 72 attached to the lower section 55b are arranged such that their heights are different in the vertical direction.

It is to be noted here that at such times as when opening or closing the door or when getting out of the vehicle by opening the door, a passenger will put a hand on the grip 45 (particularly, the horizontal portion 71) from above, and a rotational force will be applied on the attachment parts 71a, 72a of the grip 45. In view of this, the attachment parts 71a, 72a of the grip 45 are arranged such that their heights are different from each other in the vertical direction.

Therefore, in a state where the passenger puts the hand on the grip 45 from above, the rotational force applied on the attachment parts 71a, 72a of the grip 45 is suppressed.

Further, the horizontal portion 71 of the grip 45 is configured to extend from the motor attachment part 56 continuously. Thereby, an arrangement with an increased sense of unity between the motor attachment part 56 and the horizontal portion 71 (namely, grip 45) is maintained. This motor attachment part 56 is covered by the vehicle interior surface 53 from the inside 21 of the vehicle. This increases a sense of unity between the vehicle interior surface 53 and the grip 45, and improves the design of the door 40.

The leg portion 72 is provided to an end of the horizontal portion 71 opposite to the upper door hinge 38 (namely, on the corner portion 73 side).

In other words, the upper door hinge 38 is provided on the side of the motor attachment part 56 opposite to the leg portion 72. The door 40 is supported to be pivotable in the lateral direction (namely, in the left and right direction) about an axis defined by the upper door hinge 38 and the lower door hinge 38 (refer to FIG. 4).

Thus, the horizontal portion 71 of the grip 45 extends in a direction away from the upper door hinge 38, and the leg portion 72 is disposed at a position P2 remote from the upper door hinge 38. Namely, the grip 45 is disposed at a position remote from the upper door hinge 38.

Thereby, when the door 40 is opened or closed with a hand on the grip 45, opening and closing forces F1, F2 (refer to FIG. 5) of the door 40 are allowed to be applied on a position P3 remote from the upper door hinge 38, and this makes opening and closing of the door 40 easier.

Furthermore, the motor attachment part 56 is disposed closer to the grip 45 than the upper door hinge 38. It is to be noted here that the upper door hinge 38 and the lower door hinge 38 (refer to FIG. 3) are disposed to the right of the vehicle widthwise center. Thus, owing to the disposing of the motor attachment part 56 closer to the grip 45, the motor attachment part 56 is disposed close to the vehicle widthwise center.

The motor 48 of the wiper device 43 is attached to this motor attachment part 56 via the motor bracket 51. Thus, the motor 48 of the wiper device 43 (namely, the support shaft 52 of the wiper blade 49 (refer to FIG. 1)) is disposed close to the vehicle widthwise center.

As shown in FIG. 1, the support shaft 52 of the wiper blade 49 is disposed on the vehicle widthwise center side. Namely, in the region of the door window glass 42 and the gate window glass 32, the support shaft 52 is disposed substantially centrally in the vehicle width direction.

Thus, in the door window glass 42 and the gate window glass 32, a large wiping area S1 of the wiper blade 49 of the wiper device 43 is secured. Thereby, a favorable view from the inside 21 of the vehicle (refer to FIG. 2) to the outside 22 of the vehicle is achieved.

Further, the motor 48 is disposed closer to the grip 45 (refer to FIG. 6) than the upper door hinge 38. Thus, the wiper blade 49 (specifically, the distal end of the wiper blade 49) is shifted toward a left side portion 42a of the door window glass 42.

Thereby, in the door window glass 42, a large wiping area S2 of the wiper blade 49 is secured.

As shown in FIG. 7, the corner portion 73 is formed at a corner where the horizontal portion 71 and the leg portion 72 intersect. Thus, in a state where a hand is put on the horizontal portion 71 of the grip 45, movement of the hand along the horizontal portion 71 may be regulated by the corner portion 73.

Thereby, the hand can be retained at the corner portion 73, and the grip 45 can be grabbed favorably with the hand.

Further, as shown in FIG. 5, by disposing the grip 45 to project upward from the upper surface 63 of the vehicle interior surface 53, it is possible to arrange the grip 45 along an extension line 64 of the general surface 62. This prevents the grip 45 from projecting from the general surface 62 of the door 40 toward the inside 21 of the vehicle in the horizontal direction, or suppresses an amount of projection of the grip 45 in the horizontal direction.

For example, in a case where the attachment part 71*a* of the horizontal portion 71 (refer to FIG. 6) and the attachment part 72*a* of the leg portion 72 are provided on an outer side of the general surface 62 in the vehicle width direction, it is possible to prevent the grip 45 from projecting from the general surface 62 toward the inside 21 of the vehicle.

Even in a case where the attachment part 71*a* of the horizontal portion 71 and the attachment part 72*a* of the leg portion 72 are brought near the general surface 62, an amount of projection of the grip 45 from the general surface 62 toward the inside 21 of the vehicle can be suppressed.

Thereby, a large space is secured in the inside 21 of the vehicle, and therefore, when luggage is loaded into the inside 21 of the vehicle, for example, the luggage is prevented from interfering with the grip 45.

Figure 8:
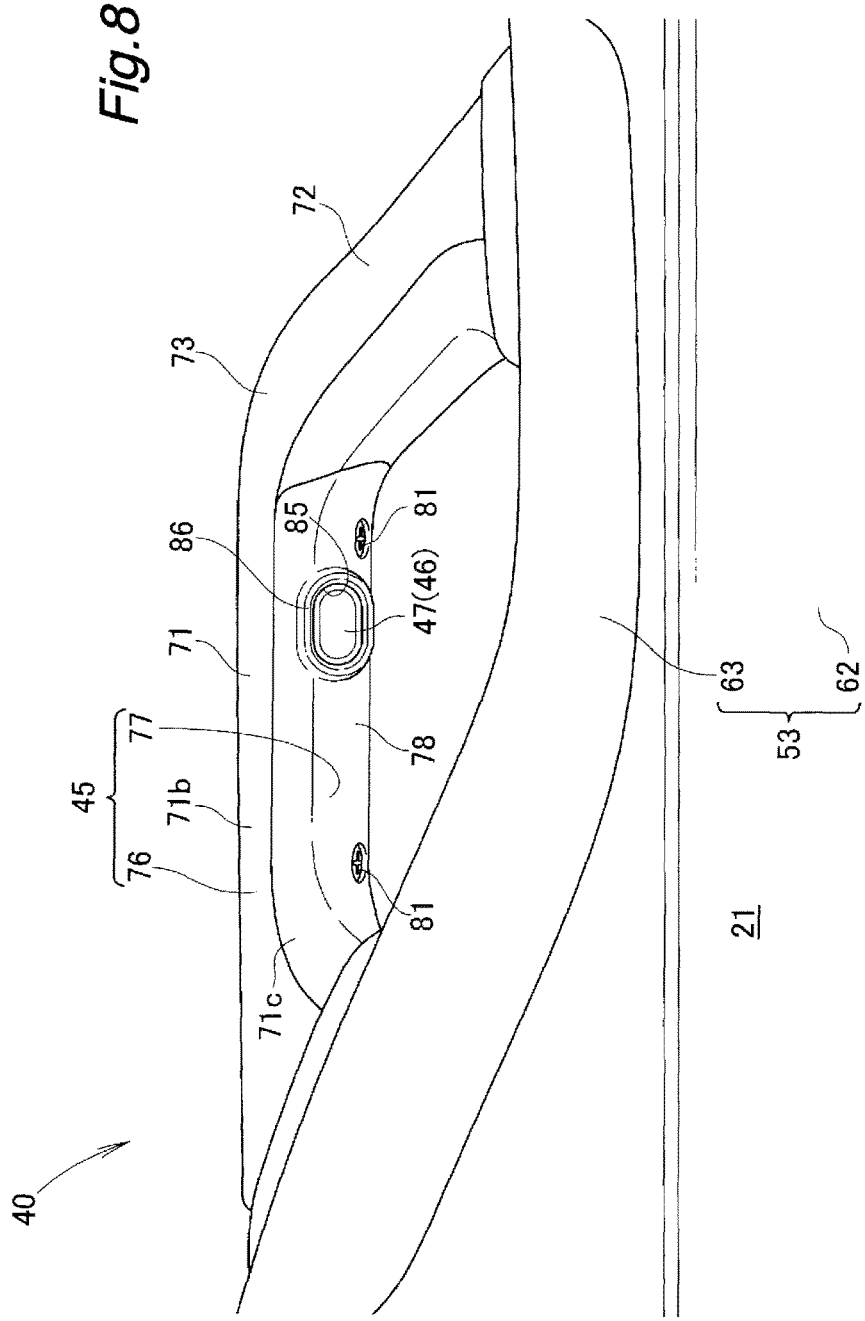
FIG. 8 is a perspective view showing the grip of FIG. 7 as viewed from a lower point inside the vehicle.
Figure 9:
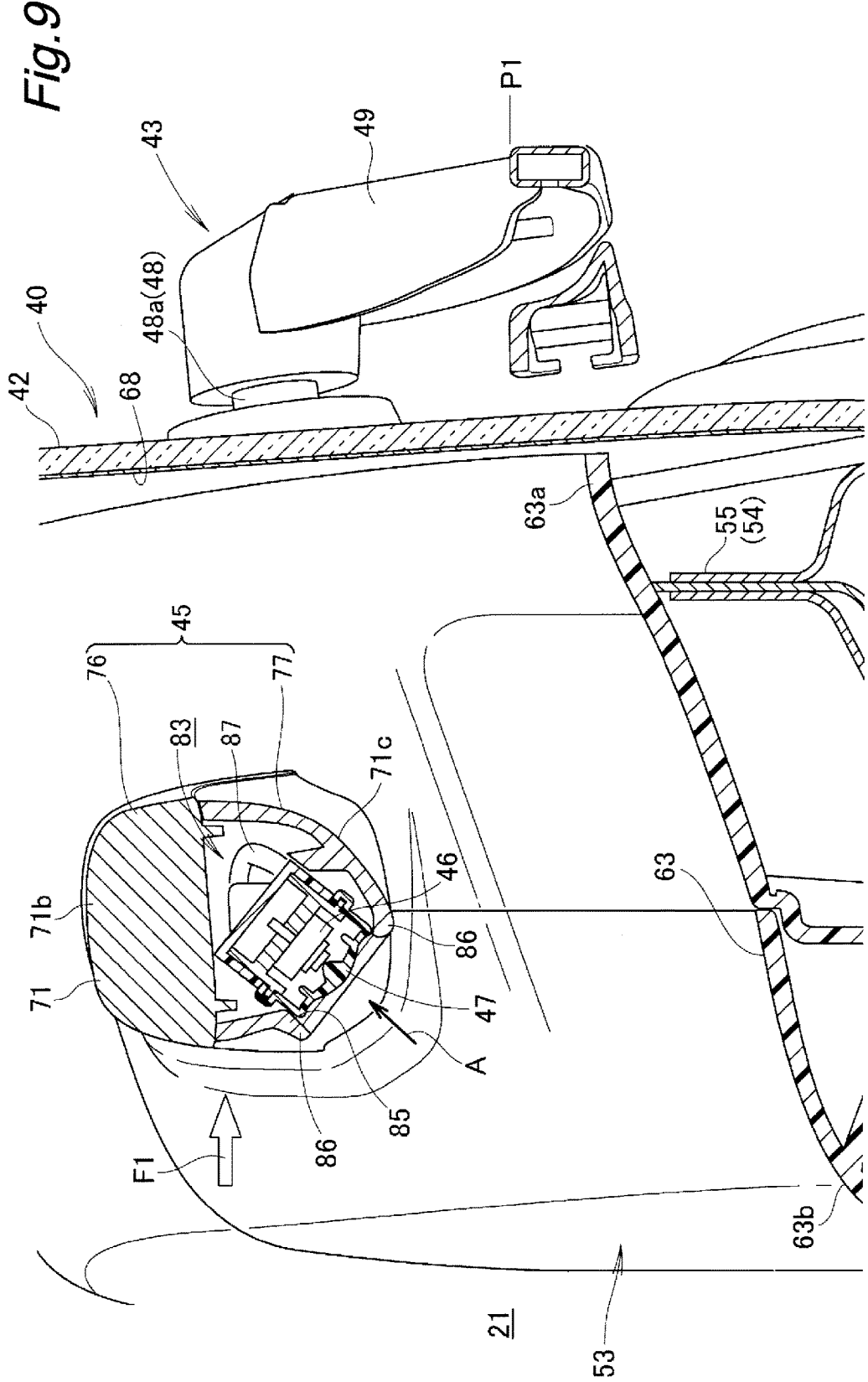
FIG. 9 is a cross-sectional view taken along line 9-9 in FIG. 7.

As shown in FIGS. 8 and 9, the grip 45 includes a bar member 76 disposed on a side opposite to the vehicle interior surface 53, and an inner cover member 77 disposed on a side facing the vehicle interior surface 53. In the state where the inner cover member 77 is assembled to the bar member 76, the bar member 76 and the inner cover member 77 form the grip 45 having a substantially circular cross section.

The bar member 76 is a part that constitutes an outer circumference 71*b* of the horizontal portion 71 and the leg portion 72. The outer circumference 71*b* of the horizontal portion 71 and the leg portion 72 form the bar member 76 substantially in an inverted V-shape as viewed in side view. In other words, the bar member 76 is formed to be substantially in an inverted V-shape as viewed from the inside 21 of the vehicle.

The outer circumference 71*b* of the horizontal portion 71 has a substantially semicircular cross section and is formed to be solid such that is has a higher stiffness than the inner cover member 77.

The horizontal portion 71 is a part to be grabbed with a hand when the door 40 is opened or closed. Therefore, the outer circumference 71*b* of the horizontal portion 71 is formed to be solid to ensure stiffness of the horizontal portion 71. It is to be noted here that the leg portion 72 is formed to have a closed cross section to ensure stiffness.

Thereby, the stiffness of the bar member 76 is improved, and stiffness of the grip 45 is ensured.

Further, the inner cover member 77 is a part that forms an inner circumference 71*c* of the horizontal portion 71 and is formed to be hollow, with a cross section of a substantially semicircular arc shape. This inner cover member 77 includes an opposing portion 78. The inner cover member 77 is placed to overlap the outer circumference 71*b* of the horizontal portion 71 from below, and the inner cover member 77 that has been placed to overlap is attached to the outer circumference 71*b* of the horizontal portion 71 with a pair of screws 81.

In this state, a space 83 is formed between the outer circumference 71*b* of the horizontal portion 71 and the inner circumference 71*c* of the horizontal portion 71.

The opposing portion 78 is spaced apart from the upper surface 63 of the vehicle interior surface 53, and is disposed at a position opposing the vehicle interior surface 53 (particularly, the upper surface 63). In a part of the opposing portion 78 in the vicinity of the corner portion 73 is formed a switch opening 85 in the shape of an elongated hole. Thus, the switch opening 85 is disposed on an underside of the grip 45 at a position opposing the vehicle interior surface 53 (particularly, the upper surface 63).

Along a periphery of the switch opening 85 is formed a surrounding wall 86 in an endless shape. The surrounding wall 86 extends out from the periphery of the switch opening 85 toward the upper surface 63 to the outside of the opposing portion 78 (in other words, toward the inside 21 of the vehicle).

In the state where the inner circumference 71*c* of the horizontal portion 71 is attached to the outer circumference 71*b* of the horizontal portion 71, the space 83 defined between the outer circumference 71*b* and the inner circumference 71*c* accommodates the switch 46 therein. The switch 46 accommodated in the space 83 is attached to the outer circumference 71*b* of the horizontal portion 71 with a screw (not shown in the drawings). The switch 46 includes an operation surface 47 for operating the switch 46.

In the state where the switch 46 is attached to the outer circumference 71*b* of the horizontal portion 71, the operation surface 47 of the switch 46 is placed in the switch opening 85 of the opposing portion 78. The switch opening 85 is provided on the underside of the grip 45 at a position opposing the upper surface 63.

Thus, the operation surface 47 of the switch 46 is disposed on the underside of the grip 45 and is exposed from the switch opening 85 to the upper surface 63 side.

By arranging the operation surface 47 on the underside of the grip 45 as described above, it is possible to inhibit the luggage, the passenger's hand, or the like from inadvertently touching the operation surface 47 of the switch 46. Thereby, the door 40 is inhibited from opening inadvertently.

Further, a wire harness (wiring) 87 is routed through the space 83 between the outer circumference 71*b* of the horizontal portion 71 and the inner circumference 71*c* of the horizontal portion 71. The routed wire harness 87 is connected with the switch 46. Namely, the wire harness 87 for the switch 46 is routed using the space 83 between the outer circumference 71*b* and the inner circumference 71*c* (refer to FIG. 6 also).

As described above, by increasing the stiffness of the bar member 76, it becomes possible to increase the stiffness of the grip 45 with the bar member 76. Further, by forming the space 83 between the outer circumference 71*b* and the inner circumference 71*c*, it becomes possible to route the wire harness 87 using the space 83.

In addition, the grip 45 is divided into the bar member 76 and the inner cover member 77. Thus, prior to the assembly of the inner cover member 77 to the bar member 76, it is possible to attach the switch 46 thereto and route the wire harness 87 therein. Thereby, the work for attaching the switch 46 and routing the wire harness 87 can be facilitated.

Further, the switch opening 85 is provided to a part of the opposing portion 78 adjacent to the corner portion 73 and facing the inside 21 of the vehicle. As a result, the operation surface 47 of the switch 46 is disposed at the part of the opposing portion 78 adjacent to the corner portion 73 and facing the inside 21 of the vehicle.

By arranging the operation surface 47 of the switch 46 to face the inside 21 of the vehicle, the operation surface 47 of the switch 46 can be viewed easily from the inside 21 of the vehicle, and this improves the operability of the operation surface 47 by the passenger.

Further, the operation surface 47 of the switch 46 is disposed at a part of the opposing portion 78 adjacent to the corner portion 73. Thus, the operation surface 47 is disposed at a position that is to be adjacent to the hand retained at the corner portion 73. Thereby, it becomes possible to operate the operation surface 47 easily with the hand retained at the corner portion 73, and the operability of the switch 46 is improved.

Here, the hand is put on the horizontal portion 71 of the grip 45 to exert an opening force F1 in an opening direction of the door 40. Consequently, the door 40 is pivoted to open about the axis defined by the upper door hinge 38 and the lower door hinge 38 (refer to FIG. 3 also). This urges the hand to move along the horizontal portion 71 in the direction away from the upper door hinge 38 (refer to FIG. 7 also).

Therefore, the leg portion 72 is provided to the end part of the horizontal portion 71 on the side opposite to the upper door hinge 38 (namely, on the corner portion 73 side). In addition, the switch 46 is provided adjacent the corner portion 73 formed by the horizontal portion 71 and the leg portion 72.

Thus, the operation surface 47 of the switch 46 is provided in the direction in which the hand is urged to move when the door 40 is opened. Thereby, when opening the door 40, it is possible to operate the operation surface 47 easily with the hand, and the operability of the switch 46 is improved.

Incidentally, when a passenger opens the door 40 from the inside 21 of the vehicle, the passenger puts the left hand on the horizontal portion 71 from above the grip 45. In the state where the passenger puts the left hand on the horizontal portion 71 from above the grip 45, the thumb of the left hand is positioned adjacent to the corner portion 73 on the side facing the inside 21 of the vehicle.

It is to be noted here that the operation surface 47 of the switch 46 is disposed adjacent to the corner portion 73 so as to face the inside 21 of the vehicle. Thus, in the state where the passenger puts the left hand on the horizontal portion 71 from above the grip 45, the thumb is placed in the vicinity of the operation surface 47. Thereby, the operability of the switch 46 by the thumb is improved.

Further, the surrounding wall 86 of the opposing portion 78 extends out more than the operation surface 47 of the switch 46 in the direction of pressing of the switch 46 (direction of arrow A). The surrounding wall 86 is formed to cover the entire circumference of the operation surface 47. Thereby, the entire circumference of a part of the operation surface 47 of the switch 46 facing the inside 21 of the vehicle is covered by the surrounding wall 86. Namely, the part of the operation surface 47 facing the inside 21 of the vehicle is located inward of the distal end of the surrounding wall 86.

Thereby, in a state where a hand is put on the grip 45, the surrounding wall 86 can inhibit the operation surface 47 of the switch 46 from being operated inadvertently by the hand.

Next, description will be made of an example in which a passenger 90 closes the door 40 from the inside 21 of the vehicle, with reference to FIG. 10.

Figure 10A:
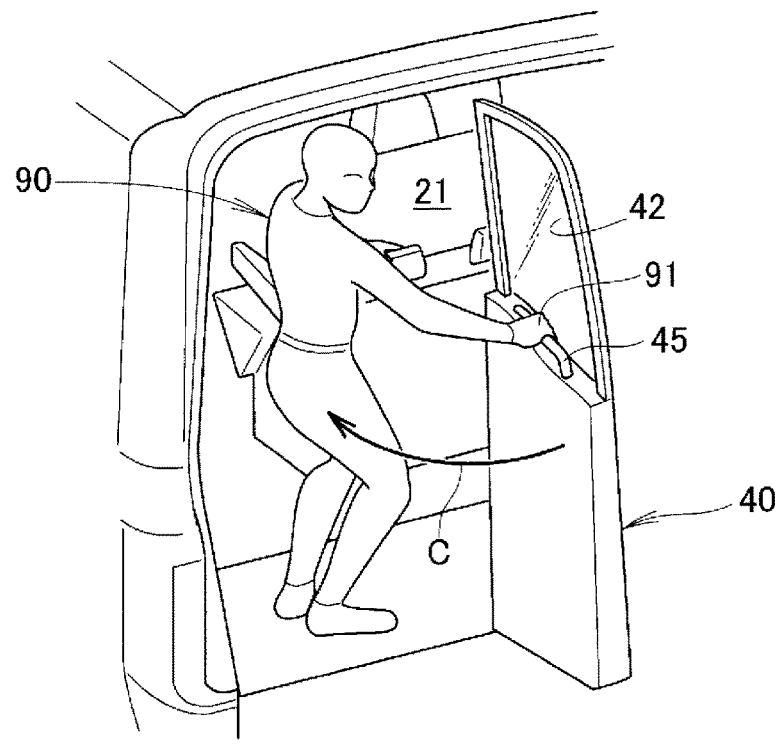
FIG. 10 is a diagram for explaining an example in which a passenger closes the door of the door-equipped vehicle body structure relating to the present invention.

As shown in FIG. 10a, in a state where the door 40 is opened, the passenger 90 gets in the inside 21 of the vehicle. The passenger 90 who has got in the vehicle puts the right hand 91 on the grip 45.

It is to be noted here that in the state where the door 40 is opened, the grip 45 is placed at a position relatively close to the inside 21 of the vehicle. Thus, the passenger 90 who has got in the vehicle can extend the right hand 91 and put it on the grip 45 easily.

Figure 10B:
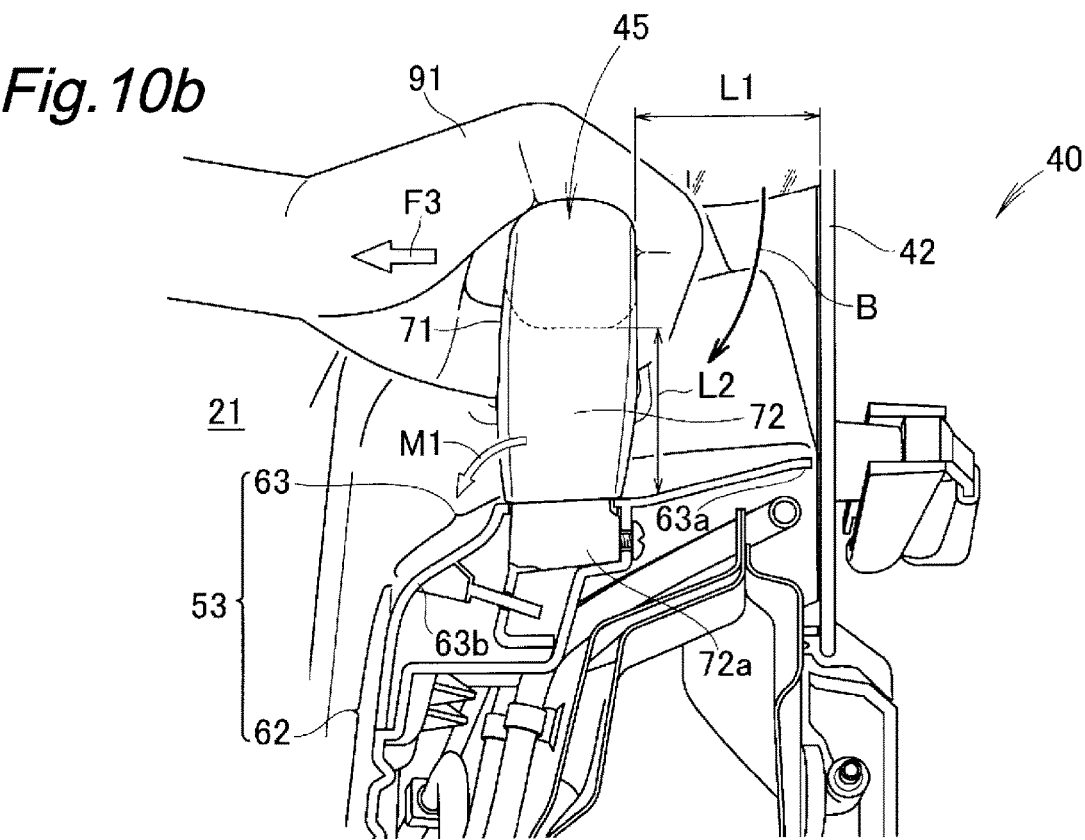

As shown in FIG. 10b, the grip 45 is spaced apart from the door window glass 42 by the distance L1. Further, the grip 45 is spaced apart from the vehicle interior surface 53 (particularly, the upper surface 63) by the distance L2. In addition, the upper surface 63 is slanted downward from its outer end 63a on the door window glass 42 side to its inner end 63b on the general surface 62 side.

Thus, it is possible to put the right hand 91 on the grip 45 and grab the grip 45 with the right hand 91 easily, as indicated by arrow B.

Incidentally, when the passenger 90 who has got in the vehicle closes the door 40 with the right hand 91, the passenger can close the door 40 with a closing force (load) F3, without applying a weight on the grip 45. Thus, when the load F3 is applied on the grip 45 in the horizontal direction, a rotational force (moment) M1 acting on the attachment part 72a of the grip 45 and a rotational force (moment) acting on the attachment part 71a of the grip 45 (refer to FIG. 12a) are suppressed.

Further, an arrangement is made such that the heights of the attachment parts 71a, 72a (refer to FIG. 12a) of the grip 45 are different in the vertical direction. Thereby, the rotational force M1 acting on the attachment part 72a and the rotational force acting on the attachment part 71a are suppressed.

Thus, as the rotational force M1 acting on the attachment part 72a and the rotational force acting on the attachment part 71a are suppressed, the attachment parts 71a, 72a of the grip 45 can support the load F3 acting on the grip 45 in the horizontal direction.

Referring back to FIG. 10a, in the state where the passenger 90 grabs the grip 45 with the right hand 91, the passenger 90 can close the door 40 as indicated by arrow C, by pulling the grip 45 toward the passenger 90.

Next, with reference to FIGS. 11 and 12, description will be made of an example in which the passenger 90 opens the door 40 and gets out of the vehicle from the inside 21 of the vehicle.

Figure 11A:
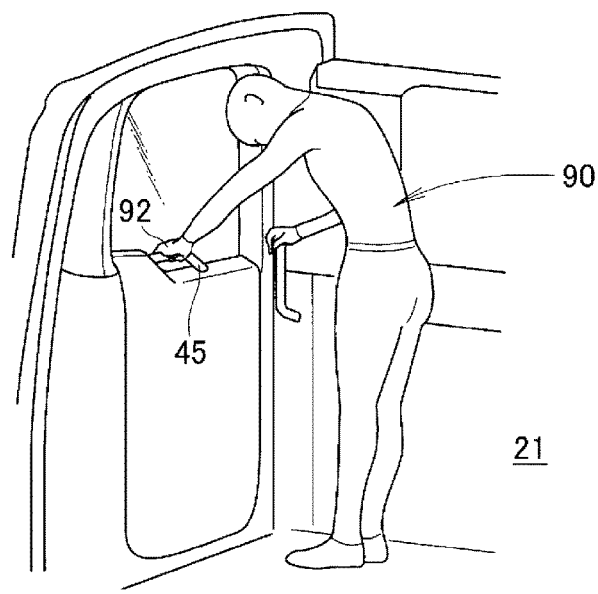
FIG. 11 is a diagram for explaining an example in which a passenger opens the door of the door-equipped vehicle body structure relating to the present invention.

As shown in FIG. 11a, the passenger 90 having stood up from the seat puts the left hand 92 on the grip 45 from the inside 21 of the vehicle.

Figure 11B:
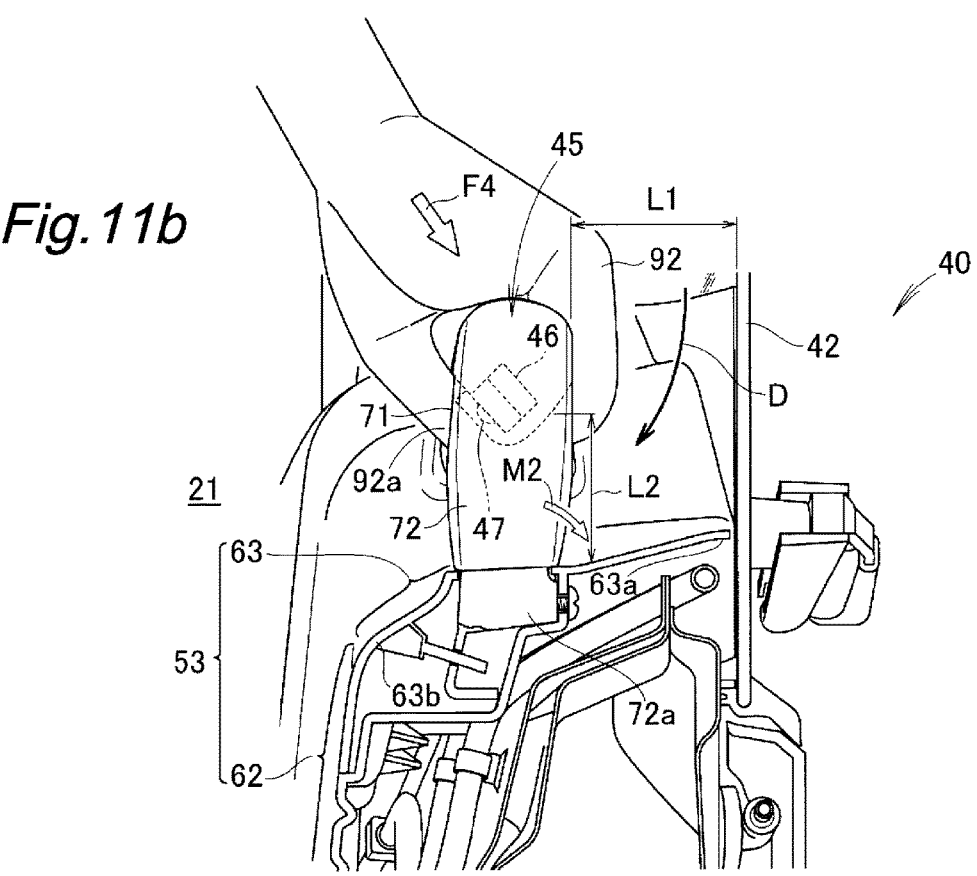

As shown in FIG. 11b, the grip 45 is spaced apart from the door window glass 42 by the distance L1, and is spaced apart from the vehicle interior surface 53 (particularly, the upper surface 63) by the distance L2. Further, the upper surface 63 is slanted downward from the door window glass 42 side to the general surface 62 side.

Thus, when putting the left hand 92 on the grip 45 from above, the passenger can easily grab the horizontal portion 71 of the grip 45 with the left hand 92 from above, as indicated by arrow D. In this state, the passenger applies a weight on the grip 45 with the left hand 92 to exert a load F4 from above, and at the same time operates (presses) the operation surface 47 of the switch 46 with a thumb 92a.

The load F4 tends to be relatively large because it results from the applied weight of the passenger 90. A horizontal component of the load F4 serves as an opening force of the door 40.

Figure 12A:
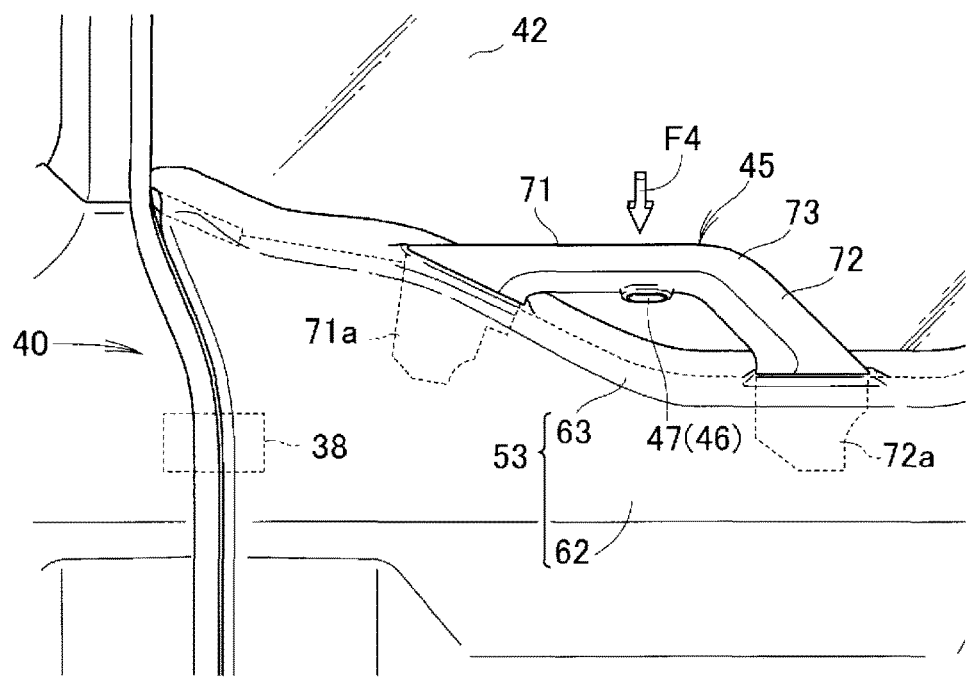
FIG. 12 is a diagram for explaining an example in which a passenger opens the door of the door-equipped vehicle body structure relating to the present invention and gets out of the vehicle.

As shown in FIG. 12a, when the door 40 is opened with the load F4 being applied on the horizontal portion 71 of the grip 45, the left hand 92 (refer to FIG. 11b) is urged to move along the horizontal portion 71 toward the corner portion 73.

It is to be noted here that the switch 46 is provided at the part of the horizontal portion 71 adjacent to the corner portion 73. Therefore, the left hand 92 can be retained at a position where the switch 46 can be operated easily. Thereby, it is possible to operate the operation surface 47 easily with the left hand 92 when opening the door 40.

Incidentally, in the state where the passenger 90 in the inside 21 of the vehicle holds the horizontal portion 71 with the left hand 92 from above, the thumb 92a (refer to FIG.

11b) of the left hand 92 is positioned adjacent to the corner portion 73 on the side facing the inside 21 of the vehicle.

It is to be noted here that the operation surface 47 of the switch 46 is disposed adjacent to the corner portion 73 so as to face the inside 21 of the vehicle. Thus, in the state where the passenger 90 puts the left hand 92 on the horizontal portion 71 from above the grip 45, it is possible to operate the operation surface 47 of the switch 46 easily with the thumb 92a.

An operation of the operation surface 47 of the switch 46 activates the latch device 44 (refer to FIG. 3). By activation of the latch device 44, the engagement between the latch device 44 and the striker 39 (refer to FIG. 3) is released.

Referring back to FIG. 11b, the grip 45 projects upward from the upper surface 63 of the vehicle interior surface 53. Thus, of the load F4 acting upon the grip 45 from above, a horizontal component serves as an opening force of the door 40, whereby the opening force of the door 40 is controlled to a proper level. Further, the horizontal portion 71 and the leg portion 72 are joined to each other at the corner portion 73. Thus, a part of the horizontal component of the load F4 is supported by the horizontal portion 71.

Thereby, even if a relatively large load F4 is applied on the grip 45 from above, rotational force (moment) M2 acting on the attachment part 72a of the grip 45 is suppressed.

Further, because the horizontal portion 71 and the leg portion 72 are joined to each other by the corner portion 73, the ends of the horizontal portion 71 are supported by the attachment part 71a (refer to FIG. 12a) and the leg portion 72. Thus, the rotational force (moment) acting on the attachment part 71a of the grip 45 is suppressed.

As described above, the rotational force acting on the attachment part 71a of the grip 45 and the rotational force (moment) M2 acting on the attachment part 72a of the grip 45 are suppressed. Thereby, the load F4 acting on the grip 45 from above can be supported without increasing the stiffness of the attachment parts 71a, 72a of the grip 45.

In the state where the load F4 is supported by the grip 45, by operating the operation surface 47 of the switch 46, it is possible to open the door 40 with the horizontal component of the load F4.

Figure 12B:
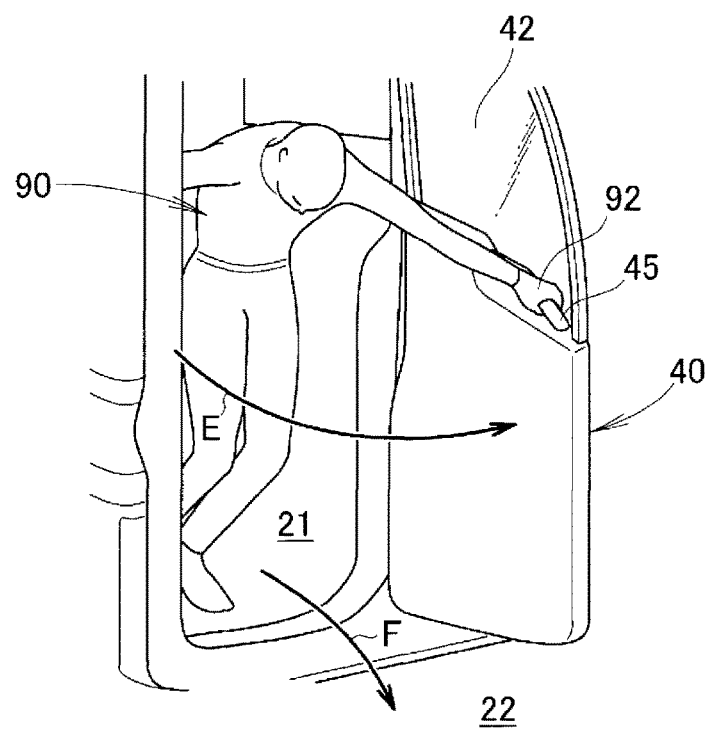

As shown in FIG. 12b, the door 40 is opened with the left hand 92 horizontally as indicated by arrow E. In this state, holding the grip 45 with the left hand 92 from above, the passenger 90 gets from the inside 21 of the vehicle to the outside 22 as indicated by arrow F.

Figure 13:
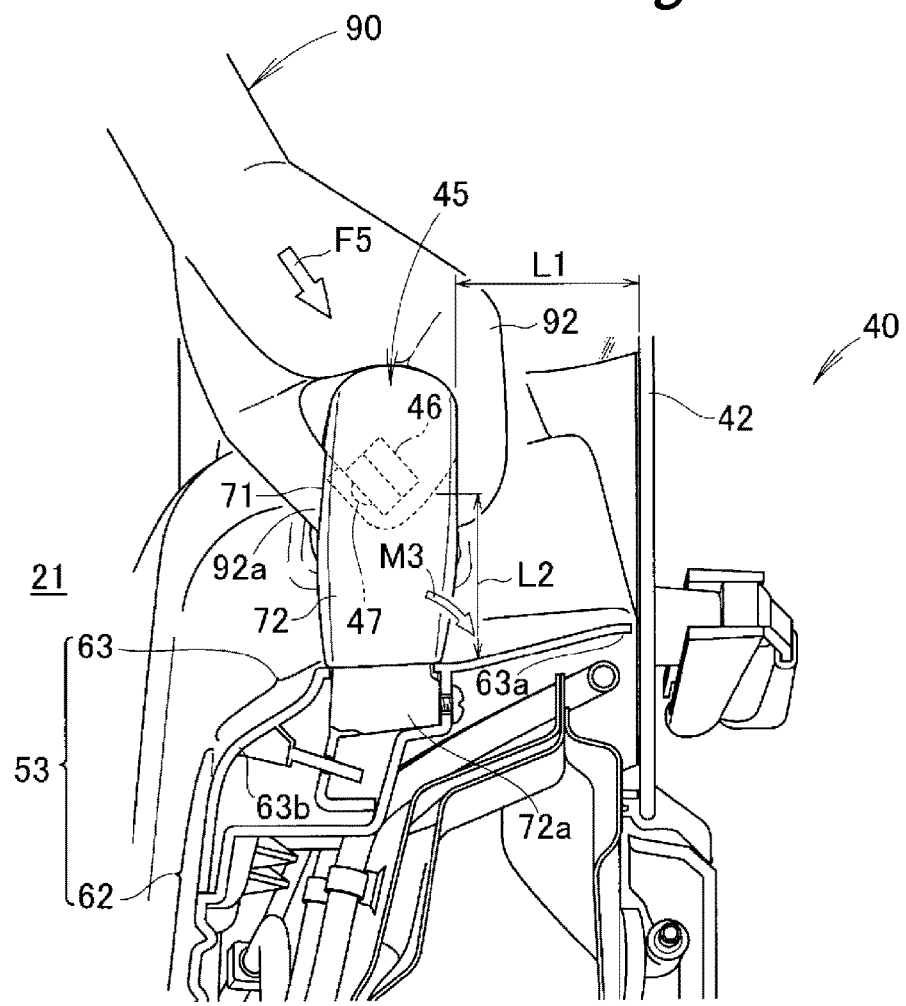
FIG. 13 is a diagram for explaining an example in which a load applied on the grip when a passenger gets out of the vehicle relating to the present invention is supported.

As shown in FIG. 13, when the passenger gets out of the vehicle, the weight of the passenger 90 acts on the grip 45, and therefore, a relatively large load F5 is applied on the grip 45.

It is to be noted here that the grip 45 projects upward from the upper surface 63 of the vehicle interior surface 53. Thus, even though the relatively large load F5 is applied on the grip 45 from above, the rotational force (moment) is suppressed similarly to the case where the load F4 (refer to FIG. 11b) is applied from above.

Specifically, the rotational force (moment) acting on the attachment part 71a of the grip 45 (refer to FIG. 12a) and the rotational force (moment) M3 acting on the attachment part 72a of the grip 45 are suppressed.

Thereby, the load F5 acting on the grip 45 from above can be supported without increasing the stiffness of the attachment parts 71a, 72a of the grip 45.

It is to be noted that the door-equipped vehicle body structure regarding the present invention is not limited to above-described embodiment, and may be altered or modified as appropriate.

For instance, in the aforementioned embodiment, description was made of an example in which the door 40 is provided with the latch device 44 and the tailgate 15 is provided with the striker 39. However, the present invention is not limited to this, and it is also possible to provide the door 40 with the striker 39 and provide the tailgate 15 with the latch device 44.

Further, in the aforementioned embodiment, the door 40 attached to the tailgate 15 was exemplarily shown as a door supported on the vehicle, but the present invention is not limited to this, and it is also possible to apply the present invention to any door directly attached to the vehicle.

Further, in the aforementioned embodiment, description was made of an example in which the bar member 76 was made to have a solid cross section to improve the stiffness of the bar member 76, but the present invention is not limited to this, and it is also possible to improve the stiffness of the bar member 76 by forming the bar member 76 to have another shape such as that with a closed cross section.

Further, in the aforementioned embodiment, description was made of an example in which the entire circumference of the operation surface 47 of the switch 46 was covered by the surrounding wall 86, but the present invention is not limited to this, and it is also possible to make a configuration such that only a part of the operation surface 47 of the switch 46 facing the inside 21 of the vehicle is covered by the surrounding wall 86.

Further, in the aforementioned embodiment, description was made with the window panel consisting of the door window glass 42, but the present invention is not limited to this, and the window panel may consist of another panel such as a resin panel.

Further, in the aforementioned embodiment, description was made of an example in which the inner-outer surface 63 was an upper surface, but the inner-outer surface 63 is not limited to the upper surface and may be another surface such as a side surface of a door widthwise end part.

Further, the shape and structure of the vehicle body structure, vehicle, rear portion of the vehicle, door opening, upper door hinge, striker, door, door window glass, wiper device, latch device, grip, switch, operation surface of the switch, motor, wiper blade, vehicle interior surface, window opening, motor attachment part, door surface, general surface, upper surface, horizontal portion, outer circumference of the grip, inner circumference of the grip, leg portion, corner portion, bar member, inner cover member, opposing portion, surrounding wall, wire harness, etc. shown in the aforementioned embodiment are not limited to those illustrated, and may be altered as appropriate.

INDUSTRIAL APPLICABILITY

The present invention can be favorably applied to an automobile having a door-equipped vehicle body structure, in which the vehicle is provided with a door opening and a door for opening and closing the door opening, and the door is provided with a grip.

GLOSSARY 10 vehicle body structure (door-equipped vehicle body structure)
11 vehicle
11a rear portion of the vehicle
21 inside of the vehicle
22 outside of the vehicle
35 door opening 38 upper door hinge (hinge)
39 striker
40 door
42 door window glass (window panel)
43 wiper device
44 latch device
45 grip
46 switch
47 operation surface of the switch
48 motor (drive unit)
49 wiper blade
53 vehicle interior surface
54 window opening
55 lower edge of the window opening
56 motor attachment part
61 door surface
62 general surface
62a upper end of the general surface
63 upper surface (inner-outer surface)
71 horizontal portion
71b outer circumference of the grip
71c inner circumference of the grip
72 leg portion
73 corner portion
76 bar member
77 inner cover member
78 opposing portion
86 surrounding wall
87 wire harness (wiring)
P1 stop position

The invention claimed is:

1. A door-equipped vehicle body structure, comprising a door opening defined in a vehicle body of a vehicle, a door for opening and closing the door opening, and a grip mounted to an inner side of the door, wherein:
the door is provided with a general surface extending along a door surface and an upper surface extending from an upper end of the general surface toward an outside of the vehicle;
the general surface and the upper surface constitute a part of a vehicle interior surface; and
the grip is provided so as to project upward from the upper surface,
wherein the door is provided with a window opening formed above the upper surface, and the grip is provided at a position overlapping with the window opening,
wherein the door is provided with a window panel covering the window opening, and the grip is spaced apart from the window panel in an in and out direction of the door,
wherein the door is provided with a wiper device for wiping the window panel with a wiper blade, and the grip is provided at a position overlapping with the wiper blade at a stop position in the in and out direction of the door,
wherein the door is provided, in a vicinity of a lower edge of the window opening, with a motor attachment part to which a drive unit of the wiper device is attached, a section of the lower edge of the window panel horizontally distant from the motor attachment part is located lower than a section of the lower edge of the window opening above the motor attachment part, and the grip includes:
a horizontal portion extending in a horizontal direction from the motor attachment part; and
a leg portion extending downward from the horizontal portion, and
wherein the wiper blade at the stop position is located above the section of the lower edge of the window panel horizontally distant from the motor attachment part.

2. The door-equipped vehicle body structure according to claim 1, wherein the door opening is provided in a rear portion of the vehicle, and
the door is supported by a hinge provided on a side of the motor attachment part opposite to the leg portion, such that the door is pivotable in a lateral direction.

3. The door-equipped vehicle body structure according to claim 1, wherein the upper surface is slanted downward from the window panel to the general surface.

4. The door-equipped vehicle body structure according to claim 1, further comprising:
a striker provided to one of the door and the vehicle;
a latch device provided to the other of the door and the vehicle to be engaged with the striker; and
a switch for activating the latch device,
wherein:
the vehicle interior surface faces an inside of the vehicle;
the grip includes an opposing portion that is spaced apart from the vehicle interior surface and opposes the vehicle interior surface; and
the switch is disposed on the opposing portion.

5. The door-equipped vehicle body structure according to claim 4, wherein the vehicle interior surface includes an inner-outer surface extending from the general surface toward an outside of the vehicle, and
the opposing portion opposes the inner-outer surface.

6. The door-equipped vehicle body structure according to claim 5, wherein the switch is disposed on a part of the opposing portion facing the inside of the vehicle.

7. The door-equipped vehicle body structure according to claim 5, wherein the inner-outer surface is the upper surface which extends from the upper end of the general surface toward the outside of the vehicle and from which the grip projects upward.

8. The door-equipped vehicle body structure according to claim 7, wherein the grip comprises:
a horizontal portion extending in a horizontal direction; and
a leg portion extending downward from the horizontal portion,
wherein the switch is provided adjacent to a corner portion where the horizontal portion and the leg portion intersect.

9. The door-equipped vehicle body structure according to claim 8, wherein the door is attached to the vehicle via a hinge to be pivotable in a lateral direction, and
the leg portion extends downward from an end part of the horizontal portion opposite to the hinge.

10. The door-equipped vehicle body structure according to claim 4, wherein the grip is provided with a surrounding wall that extends out more than an operation surface of the switch in a pressing direction of the switch, and
the surrounding wall covers a circumference of at least a part of the switch facing the inside of the vehicle.

11. A door-equipped vehicle body structure comprising a door opening defined in a vehicle body of a vehicle, a door for opening and closing the door opening, and a grip mounted to an inner side of the door, wherein:

the door is provided with a general surface extending along a door surface and an upper surface extending from an upper end of the general surface toward an outside of the vehicle;
the general surface and the upper surface constitute a part of a vehicle interior surface; and
the grip is provided so as to project upward from the upper surface,
the vehicle body structure further comprising:
  a striker provided to one of the door and the vehicle;
  a latch device provided to the other of the door and the vehicle to be engaged with the striker; and
  a switch for activating the latch device,
wherein:
the vehicle interior surface faces an inside of the vehicle;
the grip includes an opposing portion that is spaced apart from the vehicle interior surface and opposes the vehicle interior surface; and
the switch is disposed on the opposing portion,
wherein the grip comprises:
a bar member disposed on a side opposite to the vehicle interior surface and forming an outer circumference of the grip; and
an inner cover member disposed on a side facing the vehicle interior surface and forming an inner circumference of the grip, the inner cover member including the opposing portion,
wherein the bar member is formed to have a higher stiffness than the inner cover member, and
a wiring for the switch is disposed between the inner cover member and the bar member.

* * * * *